United States Patent
Mori et al.

(10) Patent No.: US 12,378,339 B2
(45) Date of Patent: Aug. 5, 2025

(54) FLUOROACRYLIC COMPOUND, FLUORINE-CONTAINING ACTINIC-RAY-CURABLE COMPOSITION, AND ARTICLE

(71) Applicant: SHIN-ETSU CHEMICAL CO., LTD., Tokyo (JP)

(72) Inventors: Seiya Mori, Annaka (JP); Yasunori Sakano, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 864 days.

(21) Appl. No.: 17/621,348

(22) PCT Filed: Jun. 22, 2020

(86) PCT No.: PCT/JP2020/024285
§ 371 (c)(1),
(2) Date: Dec. 21, 2021

(87) PCT Pub. No.: WO2020/262272
PCT Pub. Date: Dec. 30, 2020

(65) Prior Publication Data
US 2022/0389142 A1     Dec. 8, 2022

(30) Foreign Application Priority Data
Jun. 25, 2019 (JP) .................................. 2019-117387

(51) Int. Cl.
| | | |
|---|---|---|
| C08F 220/24 | (2006.01) | |
| C08F 2/48 | (2006.01) | |
| C09D 5/16 | (2006.01) | |
| C09D 7/65 | (2018.01) | |
| C09D 133/16 | (2006.01) | |

(52) U.S. Cl.
CPC ............. *C08F 220/24* (2013.01); *C08F 2/48* (2013.01); *C09D 5/1637* (2013.01); *C09D 7/65* (2018.01); *C09D 133/16* (2013.01)

(58) Field of Classification Search
CPC ............................. C08F 220/24; C09D 133/16
See application file for complete search history.

(56) References Cited

U.S. PATENT DOCUMENTS

| | | |
|---|---|---|
| 2010/0024685 A1 | 2/2010 | Sakano et al. |
| 2010/0147191 A1 | 6/2010 | Sakano et al. |
| 2010/0317875 A1 | 12/2010 | Sakano et al. |
| 2016/0326191 A1 | 11/2016 | Warner et al. |

FOREIGN PATENT DOCUMENTS

| | | |
|---|---|---|
| JP | 4-188116 A | 6/1992 |
| JP | 6-211945 A | 8/1994 |
| JP | 2010-53114 A | 3/2010 |
| JP | 2010-138112 A | 6/2010 |
| JP | 2010-285501 A | 12/2010 |
| JP | 2011-241190 A | 12/2011 |
| JP | 2013-216732 A | 10/2013 |
| JP | 2013-237824 A | 11/2013 |
| JP | 2014-221875 A | 11/2014 |
| JP | 2018-512382 A | 5/2018 |

OTHER PUBLICATIONS

International Search Report, issued in PCT/JP2020/024285, dated Sep. 8, 2020.
Written Opinion of the International Searching Authority, issued in PCT/JP2020/024285, dated Sep. 8, 2020.

*Primary Examiner* — Catherine S Branch
(74) *Attorney, Agent, or Firm* — Birch, Stewart, Kolasch & Birch, LLP

(57) ABSTRACT

A fluoroacrylic compound of formula (1) which, when added to an actinic-ray-curable composition, can impart excellent liquid repellency, antifouling properties, and wear resistance.

$$Y-Rf^1-Z^1-Q^1-[Z^2-X]_a \qquad (1)$$

[$Rf^1$ is a divalent perfluoropolyether group. $Z^1$ is a divalent hydrocarbon group optionally containing O, N, or Si. $Q^1$ is an (a+1)-valent linking group including a+1 or more Si atoms. $Z^2$ is a divalent alkylene ether group. X is H or a monovalent organic group having an (α-substituted) acryl group, and at least one of the X moieties is a monovalent organic group having an (α-substituted) acryl group. Symbol a is 1-10. Y is F or $-Z^1-Q^1-[Z^2-X]_a$. All of the $Z^1$ moiety and the a $Z^2$ moieties within the [ ] have been bonded to the Si atoms contained in the $Q^1$ and the molecule has no urethane bond therein.]

13 Claims, No Drawings

FLUOROACRYLIC COMPOUND, FLUORINE-CONTAINING ACTINIC-RAY-CURABLE COMPOSITION, AND ARTICLE

TECHNICAL FIELD

The present invention relates to a fluorine-containing acrylic compound capable of imparting excellent liquid repellency, anti-fouling property, and abrasion resistance by being added to an active energy ray-curable composition such as an ultraviolet ray or an electron beam, a fluorine-containing active energy ray-curable composition having the fluorine-containing acrylic compound, and an article having a cured product layer of the composition on a substrate surface.

BACKGROUND ART

Conventionally, a hard coat treatment has been widely and generally used as a means for protecting a surface of a resin molded body or the like. This is to form a hard cured resin layer (hard coat layer) on the surface of the molded body to make it less likely to be damaged. As a material constituting the hard coat layer, a curable composition by active energy rays such as a thermosetting resin, an ultraviolet or electron beam curable resin is often used.

With expansion of fields of application of resin molded articles and a trend of increasing added value, there are increasing demands for higher functionality of cured resin layer (hard coat layer), and as one of them, there is a demand for imparting anti-fouling property to a hard coat layer. By imparting properties such as water repellency and oil repellency to a surface of the hard coat layer, the hard coat layer is hardly stained or can be easily removed even if stained.

As a method for imparting anti-fouling property to the hard coat layer, a method of applying and/or fixing a fluorine-containing anti-fouling agent to the surface of the hard coat layer once formed has been widely used, and a method of simultaneously forming the hard coat layer and imparting anti-fouling property by adding a fluorine-containing curable component to a cured resin composition before curing and applying and curing the fluorine-containing curable component has also been studied. For example, JP-A H06-211945 (Patent Document 1) shows production of a hard coat layer imparted with anti-fouling property by adding fluoroalkyl acrylate to an acryl-based curable resin composition and curing the acryl-based curable resin composition.

The present inventors have promoted various developments as a fluorine-containing compound capable of imparting anti-fouling property to such a curable resin composition, and for example, JP-A 2013-237824 (Patent Document 2) proposes a method for imparting anti-fouling property by blending a fluorine-containing alcohol compound into a thermosetting resin. In addition, the present inventors have proposed photocurable fluorine-containing compounds shown in, for example, JP-A 2010-53114 (Patent Document 3), JP-A 2010-138112 (Patent Document 4), and JP-A 2010-285501 (Patent Document 5).

However, in recent years, use of a hard coat containing a fluorine-containing compound for an article that is easily touched by a human finger such as a touch panel tends to increase. However, when the conventional fluorine-containing compound is used for the use, the surface of the hard coat is worn due to abrasion by a human finger, and anti-fouling property is deteriorated, thus the conventional fluorine-containing compound does not have practically satisfactory abrasion resistance.

PRIOR ART DOCUMENTS

Patent Documents

Patent Document 1: JP-A H06-211945
Patent Document 2: JP-A 2013-237824
Patent Document 3: JP-A 2010-53114
Patent Document 4: JP-A 2010-138112
Patent Document 5: JP-A 2010-285501

SUMMARY OF INVENTION

Technical Problem

An object of the invention, which has been made under the above-mentioned circumstances, is to provide a fluorine-containing acrylic compound capable of imparting excellent liquid repellency, anti-fouling property, and abrasion resistance by being added to an active energy ray-curable composition such as an ultraviolet ray or an electron beam, a fluorine-containing active energy ray-curable composition having the fluorine-containing acrylic compound, and an article having a cured product layer of the composition on a substrate surface.

Solution to Problem

As a result of further studies to achieve the above object, the present inventors have found that a fluorine-containing acrylic compound (a fluorine-containing acrylic compound free of a urethane bond in a molecule) having the following general formula (1):

$$Y\text{—}Rf^1\text{-}Z^1\text{-}Q^1\text{-}[Z^2\text{—}X]_a \quad (1)$$

wherein $Rf^1$ is a divalent perfluoropolyether group with a molecular weight of 400 to 20,000 composed of a perfluoroalkylene group having 1 to 6 carbon atoms and an oxygen atom, $Z^1$ is independently a divalent hydrocarbon group having 1 to 20 carbon atoms which may contain one or more selected from an oxygen atom, a nitrogen atom and a silicon atom, and which may contain a cyclic structure therein, with the proviso that $Z^1$ is free of a urethane bond in its structure, $Q^1$ is independently an (a+1)-valent linking group containing at least (a+1) number of silicon atoms, which may take a cyclic structure, and which may contain at least one selected from an oxygen atom, a nitrogen atom and a fluorine atom, with the proviso that $Q^1$ is free of a urethane bond in its structure, $Z^2$ is independently a divalent alkylene ether group having the following formula:

$$\text{—}C_OH_{2O}\text{—}(OC_4H_8)_i(OC_3H_6)_j(OC_2H_4)_k(OCH_2)_l\text{—}$$

wherein each repeating unit may be linear or branched, the repeating units may be randomly arranged, i, j, k, and l are each independently an integer of 0 to 10 in a range where a molecular weight of $Z^2$ is 58 to 330, and o is an integer of 2 to 10, X is independently a hydrogen atom or a monovalent organic group containing an acrylic group or an α-substituted acrylic group which may contain at least one selected from an oxygen atom and a nitrogen atom, containing on the average at least one of the monovalent organic group containing an acrylic group or α-substituted acrylic group per molecule, with the proviso that each X's is free of a urethane bond in its structure, a is independently an integer of 1 to 10, and Y is a fluorine atom or a monovalent group of —$Z^1$-$Q^1$-$[Z^2—X]_a$, wherein $Z^1$ and "a" number of $Z^2$s enclosed in brackets [ ] in the formula (1) are all bonded to silicon atoms in the $Q^1$ structure, respectively, satisfies the above requirements, and is useful as a hard coating agent or the like, and thus the present invention has been completed.

Therefore, the present invention provides the following fluorine-containing acrylic compound, fluorine-containing active energy ray-curable composition, and article.

[1]

A fluorine-containing acrylic compound having the following general formula (1):

$$Y—Rf^1—Z^1-Q^1-[Z^2—X]_a \qquad (1)$$

wherein $Rf^1$ is a divalent perfluoropolyether group with a molecular weight of 400 to 20,000 composed of a perfluoroalkylene group having 1 to 6 carbon atoms and an oxygen atom, $Z^1$ is independently a divalent hydrocarbon group having 1 to 20 carbon atoms which may contain one or more selected from an oxygen atom, a nitrogen atom and a silicon atom, and which may contain a cyclic structure therein, with the proviso that $Z^1$ is free of a urethane bond in its structure, $Q^1$ is independently an (a+1)-valent linking group containing at least (a+1) number of silicon atoms, which may take a cyclic structure, and which may contain at least one selected from an oxygen atom, a nitrogen atom and a fluorine atom, with the proviso that $Q^1$ is free of a urethane bond in its structure, $Z^2$ is independently a divalent alkylene ether group having the following formula:

$$—C_oH_{2o}—(OC_4H_8)_i(OC_3H_6)_j(OC_2H_4)_k(OCH_2)_l—$$

wherein each repeating unit may be linear or branched, the repeating units may be randomly arranged, i, j, k, and l are each independently an integer of 0 to 10 in a range where a molecular weight of $Z^2$ is 58 to 330, and o is an integer of 2 to 10, X is independently a hydrogen atom or a monovalent organic group containing an acrylic group or an α-substituted acrylic group which may contain at least one selected from an oxygen atom and a nitrogen atom, containing on the average at least one of the monovalent organic group containing an acrylic group or an α-substituted acrylic group per molecule, with the proviso that each X is free of a urethane bond in its structure, a is independently an integer of 1 to 10, and Y is a fluorine atom or a monovalent group of —$Z^1$-$Q^1$-$[Z^2—X]_a$, wherein $Z^1$ and "a" number of $Z^2$s enclosed in brackets [ ] in the formula (1) are all bonded to silicon atoms in the $Q^1$ structure, respectively.

[2]

The fluorine-containing acrylic compound according to [1], wherein in the fluorine-containing acrylic compound having the general formula (1), $Rf^1$ is a divalent perfluoropolyether group having the following formula:

[Chem. 1]

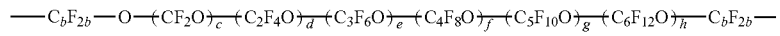

wherein b is independently for each unit an integer of 1 to 3, c, d, e, f, g, and h are each an integer of 0 to 200, and c+d+e+f+g+h is 3 to 200, each of these units may be linear or branched, and each of the repeating units shown in parentheses appended with c, d, e, f, g, and h may be randomly arranged.

[3]

The fluorine-containing acrylic compound according to [1] or [2], wherein in the fluorine-containing acrylic compound having the general formula (1), $Rf^1$ is any of divalent perfluoropolyether groups having the following structural formulas:

$$—CF_2O—(CF_2O)_p(CF_2CF_2O)_q—CF_2—$$

[Chem. 2]

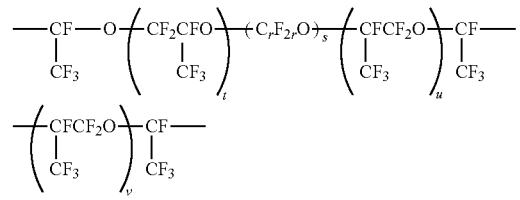

wherein, with the proviso that the repeating units enclosed in parentheses ( ) are randomly arranged, p is an integer of 1 to 199, q is an integer of 1 to 170, and p+q is 6 to 200, s is an integer of 0 to 6, t and u are each an integer of 1 to 100, t+u is an integer of 2 to 120, and s+t+u is an integer of 3 to 126, and v is an integer of 4 to 120.

[4]

The fluorine-containing acrylic compound according to any of [1] to [3], wherein in the fluorine-containing acrylic compound having the general formula (1), $Z^1$ has a structure having any of the following formulas:

$$—CH_2CH_2CH_2CH_2—$$

$$—CH_2OCH_2CH_2CH_2—$$

[Chem. 3]

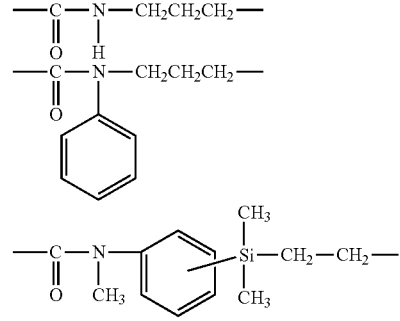

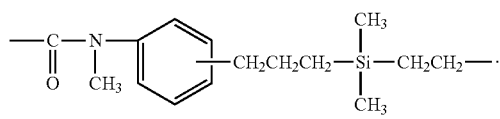

[5]

The fluorine-containing acrylic compound according to any of [1] to [4], wherein in the fluorine-containing acrylic compound having the general formula (1), $Q^1$ is an (a'+1)-valent linking group having the following formula:

[Chem. 4]

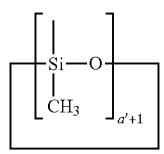

wherein a' is an integer of 2 to 10.

[6]

The fluorine-containing acrylic compound according to any of [1] to [5], wherein in the fluorine-containing acrylic compound having the general formula (1), X has a structure having the following formula:

[Chem. 5]

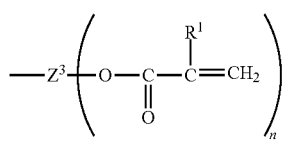

wherein $R^1$ is each independently a hydrogen atom, a fluorine atom, a methyl group, or a trifluoromethyl group, $Z^3$ is a single bond, or a divalent or trivalent hydrocarbon group having 1 to 18 carbon atoms and optionally containing an ether bond and/or an ester bond, and n is 1 or 2.

[7]

The fluorine-containing acrylic compound according to any of [1] to [6], wherein the fluorine-containing acrylic compound having the general formula (1) is a fluorine-containing acrylic compound having the following general formula (2) or (3):

[Chem. 6]

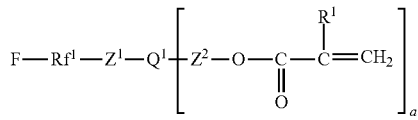

(2)

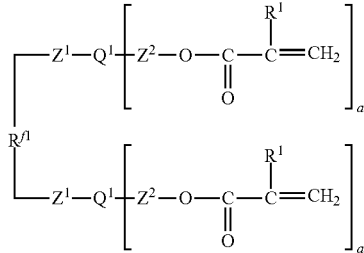

(3)

wherein $Rf^1$, $Z^1$, $Z^2$, $Q^1$ and a are as defined above, and $R^1$ is each independently a hydrogen atom, a fluorine atom, a methyl group, or a trifluoromethyl group.

[8]

The fluorine-containing acrylic compound according to any of [1] to [7], wherein the fluorine-containing acrylic compound having the general formula (1) is a fluorine-containing acrylic compound having the following general formula (4) or (5):

[Chem. 7]

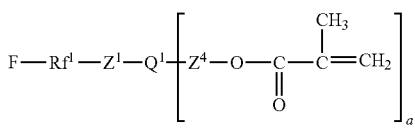

(4)

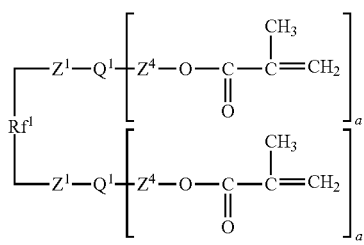

(5)

wherein $Rf^1$, $Z^1$, $Q^1$ and a are as defined above, and $Z^4$ is a divalent alkylene ether group having the following formula:

$$-C_oH_{2o}-(OC_3H_6)_{j'}(OC_2H_4)_{k'}(OCH_2)_{l'}-$$

wherein each repeating unit may be linear or branched, the repeating units may be randomly arranged, and j', k', and l' are each independently an integer of 0 to 4, with the proviso that the sum of j', k', and l' is not 0, and o is an integer of 2 to 10.

[9]

The fluorine-containing acrylic compound according to any of [1] to [8], wherein the fluorine-containing acrylic compound is selected from fluorine-containing acrylic compounds having the following formulas:

[Chem. 8]

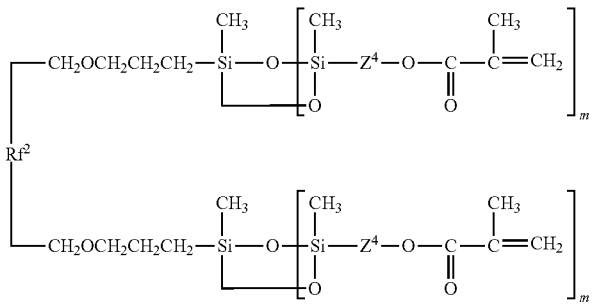

[Chem. 9]

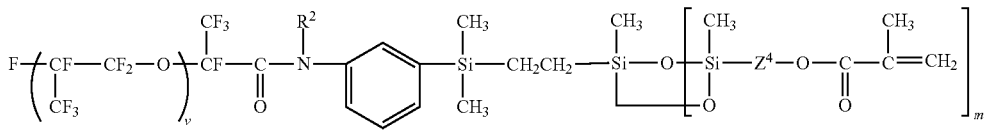

[Chem. 10]

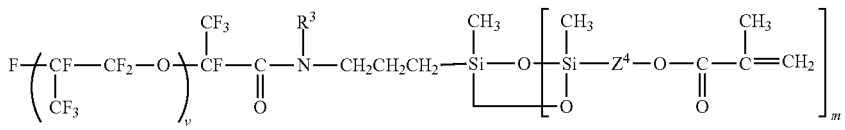

wherein $Rf^2$ is $-CF_2O-(CF_2O)_p(CF_2CF_2O)_q-CF_2-$, p is an integer of 1 to 199, q is an integer of 1 to 170, p+q is 6 to 200, and the repeating units enclosed in parentheses ( ) are randomly arranged, v is an integer of 4 to 120, $R^2$ is independently a hydrogen atom or a methyl group, and $R^3$ is independently a hydrogen atom, a methyl group, or a phenyl group, $Z^4$ is a divalent alkylene ether group having the following formula:

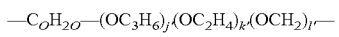

wherein each repeating unit may be linear or branched, the repeating units may be randomly arranged, and j', k', and l' are each independently an integer of 0 to 4, with the proviso that the sum of j', k', and l' is not 0, and o is an integer of 2 to 10, and m is an integer of 2 to 5.

[10]

A fluorine-containing active energy ray-curable composition comprising 0.005 to 40 parts by weight of the fluorine-containing acrylic compound according to any of [1] to [9] per 100 parts by weight of the active energy ray-curable composition.

[11]

The fluorine-containing active energy ray-curable composition according to [10], wherein the content of a volatile fluorine compound is 1 part by weight or less per 100 parts by weight of the active energy ray-curable composition.

[12]

An article having a cured product layer of the fluorine-containing active energy ray-curable composition according to [10] or [11] on its surface.

[13]

An article having a cured product layer of the fluorine-containing active energy ray-curable composition according to [10] or [11] on its surface, which has a water contact angle at 25° C. and a relative humidity of 40% of 90° or more.

Advantageous Effects of Invention

Since the fluorine-containing acrylic compound of the present invention is free of a urethane bond in a molecule, anti-fouling property is hardly deteriorated even by abrasion. Therefore, the fluorine-containing acrylic compound is useful as an anti-fouling additive for imparting liquid repellency, anti-fouling property, and abrasion resistance to an ultraviolet-curable or thermosetting hard coating agent, a coating material, a resin, an antireflection coating composition, and the like.

DESCRIPTION OF EMBODIMENTS

The fluorine-containing acrylic compound of the present invention has the following general formula (1), and may be a mixture.

$$Y-Rf^1-Z^1-Q^1-[Z^2-X]_a \quad (1)$$

wherein $Rf^1$ is a divalent perfluoropolyether group with a molecular weight of 400 to 20,000 composed of a perfluoroalkylene group having 1 to 6 carbon atoms and an oxygen atom, $Z^1$ is independently a divalent hydrocarbon group having 1 to 20 carbon atoms which may contain one or more selected from an oxygen atom, a nitrogen atom and a silicon atom, and which may contain a cyclic structure therein, with the proviso that $Z^1$ is free of a urethane bond in its structure, $Q^1$ is independently an (a+1)-valent linking group containing at least (a+1) number of silicon atoms, which may take a cyclic structure, and which may contain at least one selected from an oxygen atom, a nitrogen atom and a fluorine atom, with the proviso that $Q^1$ is free of a urethane bond in its structure, $Z^2$ is independently a divalent alkylene ether group having the following formula:

wherein each repeating unit may be linear or branched, the repeating units may be randomly arranged, i, j, k, and l are each independently an integer of 0 to 10 in a range where a molecular weight of $Z^2$ is 58 to 330, and o is an integer of 2 to 10, X is independently a hydrogen atom or a monovalent organic group containing an acrylic group or an α-substituted acrylic group which may contain at least one selected from an oxygen atom and a nitrogen atom, containing on the average at least one of the monovalent organic group containing an acrylic group or α-substituted acrylic group per molecule, with the proviso that each X's is free of a urethane bond in its structure, a is independently an integer of 1 to 10, and Y is a fluorine atom or a monovalent group of $-Z^1-Q^1-[Z^2-X]_a$, wherein $Z^1$ and "a" number of $Z^2$s enclosed in brackets [ ] in the formula (1) are all bonded to silicon atoms in the $Q^1$ structure, respectively.

The present inventors have found that a fluorine-containing acrylic compound containing a urethane bond in a molecule is excellent in compatibility with a non-fluorine-based organic solvent, but when added to an active energy ray-curable composition, anti-fouling property of a surface of a cured coating film is significantly deteriorated due to abrasion associated with practical use. Therefore, the fluorine-containing acrylic compound of the present invention has a perfluoropolyether group as a water/oil-repellent group, and an acrylic group or an α-substituted acrylic group and is free of a urethane bond in a molecule, thus the compound can impart excellent liquid repellency, anti-fouling property, and abrasion resistance by being added to the active energy ray-curable composition.

In the formula (1), $Rf^1$ is a divalent perfluoropolyether group with a molecular weight of 400 to 20,000 composed of a perfluoroalkylene group having 1 to 6 carbon atoms and an oxygen atom, and $Rf^1$ preferably has a perfluorooxyalkylene structure having 1 to 6 carbon atoms, particularly 1 to 3 carbon atoms as follows as a main repeating unit.

—CF$_2$O—

—CF$_2$CF$_2$O—

—CF(CF$_3$)CF$_2$O—

—CF$_2$CF$_2$CF$_2$O—

These structures may be any one homopolymer, or a random or block polymer composed of a plurality of structures.

Examples of $Rf^1$ having such a structure include the following structure:

[Chem. 11]

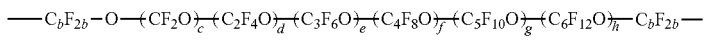

wherein b is independently for each unit an integer of 1 to 3, c, d, e, f, g, and h are each an integer of 0 to 200, and c+d+e+f+g+h is 3 to 200, each of these units may be linear or branched, and each of the repeating units shown in parentheses appended with c, d, e, f, g, and h may be randomly arranged.

In the above formula, b is independently for each unit an integer of 1 to 3.

In addition, c, d, e, f, g, and h are each an integer of 0 to 200, preferably c is an integer of 5 to 100, d is an integer of 5 to 100, e is an integer of 0 to 100, f is an integer of 0 to 100, g is an integer of 0 to 100, h is an integer of 0 to 100, c+d+e+f+g+h is 3 to 200, preferably 10 to 105, more preferably c+d is an integer of 10 to 105, and particularly 15 to 60, and e=f=g=h=0. If c+d+e+f+g+h is smaller than the above upper limit value, adhesion and curability are good, and if c+d+e+f+g+h is larger than the above lower limit value, characteristics of the fluoropolyether group can be sufficiently exhibited, which is preferable.

In the above formula, each unit may be linear or branched. In addition, the repeating units shown in parentheses appended with c, d, e, f, g, and h may be randomly arranged.

Preferred examples of $Rf^1$ having such a structure include the following structures:

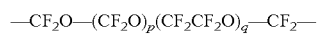

wherein the repeating units enclosed in parentheses ( ) are randomly arranged, p is an integer of 1 to 199, preferably 1 to 99, q is an integer of 1 to 170, preferably 1 to 99, and p+q is an integer of 6 to 200, preferably 10 to 100.

[Chem. 12]

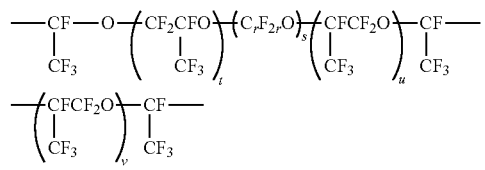

wherein the repeating units enclosed in parentheses ( ) are randomly arranged, s is an integer of 0 to 6, t is an integer of 1 to 100, u is an integer of 1 to 100, t+u is an integer of 2 to 120, preferably 4 to 100, and s+t+u is an integer of 3 to 126, preferably 4 to 100, and v is an integer of 4 to 120, preferably 4 to 80.

A molecular weight of $R^f$ is not particularly limited as long as a numerical average molecular weight of a corresponding structural part is each contained in the range of 400 to 20,000, preferably 800 to 10,000, and a molecular weight distribution thereof is not particularly limited. In the present invention, the molecular weight is a numerical average molecular weight calculated from a ratio between a terminal structure and a main chain structure based on $^1$H-NMR and $^{19}$F-NMR (the same applies hereinafter).

In the formula (1), $Z^1$ is independently a divalent hydrocarbon group having 1 to 20 carbon atoms which may contain one or more selected from an oxygen atom, a nitrogen atom and a silicon atom, and which may contain a cyclic structure therein, with the proviso that $Z^1$ is free of a urethane bond in its structure. Examples of particularly preferred structure of $Z^1$ include the following structures. In the following structures, it is preferred that the left bonding hand is bonded to $Rf^1$, and the right bonding hand is bonded to $Q^1$.

—CH$_2$CH$_2$—

—CH$_2$CH$_2$CH$_2$—

—CH$_2$CH$_2$CH$_2$CH$_2$—

—CH$_2$OCH$_2$CH$_2$—

—CH$_2$OCH$_2$CH$_2$CH$_2$—

[Chem. 13]

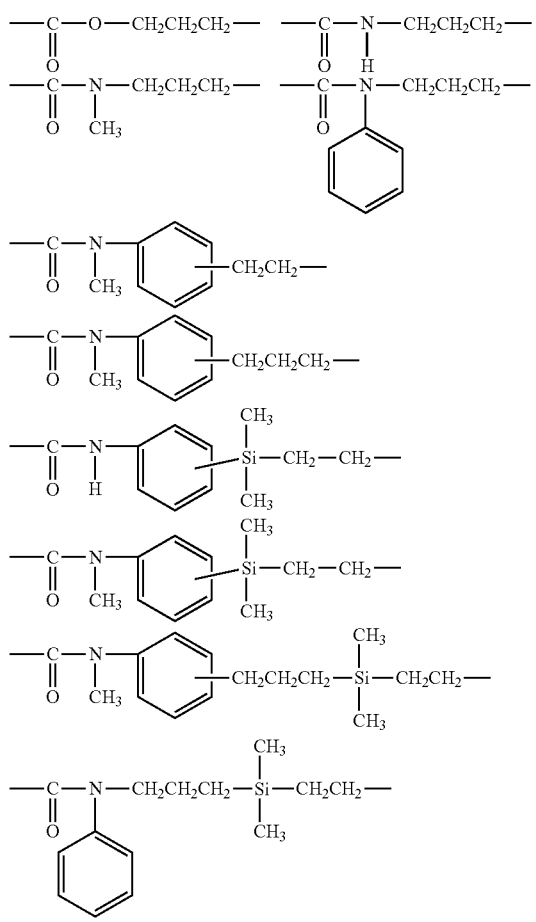

Z$^1$ is more preferably one described below.

—CH$_2$CH$_2$CH$_2$CH$_2$—

—CH$_2$OCH$_2$CH$_2$CH$_2$—

[Chem. 14]

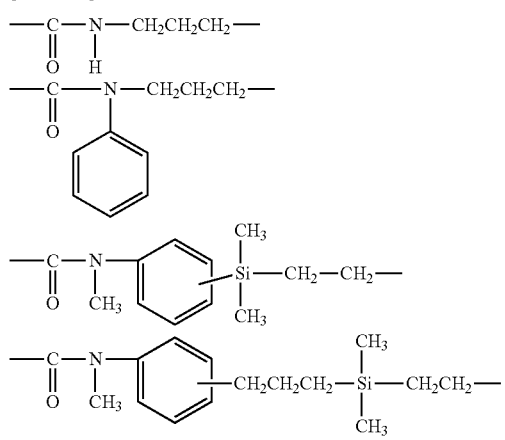

In the formula (1), a is independently an integer of 1 to 10, preferably an integer of 2 to 8.

In the formula (1), Q$^1$ is independently an (a+1)-valent linking group containing at least (a+1) number of silicon atoms, which may take a cyclic structure, and which may contain at least one selected from an oxygen atom, a nitrogen atom and a fluorine atom, with the proviso that Q$^1$ is free of a urethane bond in its structure. Preferred examples of such Q1 include an (a+1)-valent linking group composed of a siloxane structure, an unsubstituted or halogen-substituted silalkylene structure, a silarylene structure, or a combination of two or more thereof, each of which has (a+1) number of Si atoms. Specifically, the following structures are shown as particularly preferred structures.

Note that in the following formulas, a is the same as a in the formula (1), and is independently an integer of 1 to 10, preferably an integer of 2 to 8. a' is an integer of 2 to 10, preferably an integer of 2 to 7. r is an integer of 1 to 5, preferably an integer of 3 to 5. Arrangement of the units is random, and a bond hand (silicon atom) of each of the (a+1) and (a'+1) number of units and the like is bonded to any one of "a" number of Z$^2$s enclosed in brackets [ ] and Z$^1$ in the formula (1).

[Chem. 15]

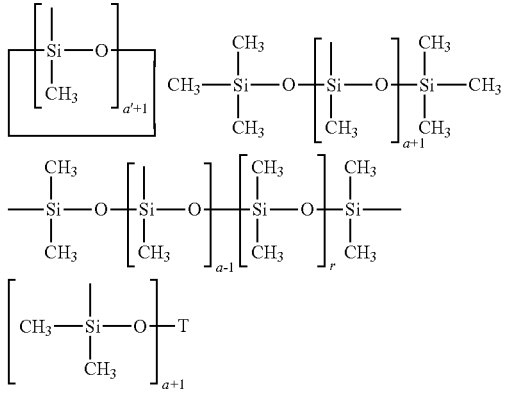

Here, T is an (a+1)-valent linking group, and examples thereof include the following.

[Chem. 16]

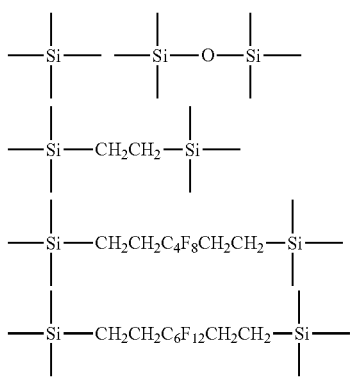

Among them, Q$^1$ in the formula (1) is preferably an (a'+1)-valent linking group of

[Chem. 17]

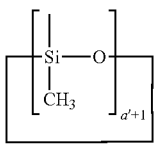

wherein a' is as defined above.

In the above formula (1), $Z^2$ is independently a divalent alkylene ether group having the following formula:

wherein each repeating unit may be linear or branched, the repeating units may be randomly arranged, i, j, k, and l are each independently an integer of 0 to 10 (that is, the sum of i, j, k, and l is 1 or more.) in a range where a molecular weight of $Z^2$ is 58 to 330, preferably 72 to 300, it is preferred that i is an integer of 0 to 5, j is an integer of 0 to 5, k is an integer of 0 to 5, and l is an integer of 0 to 5, and o is an integer of 2 to 10, preferably an integer of 2 to 8. In the above structures, it is preferred that the left bond hand is bonded to $Q^1$, and the right bond hand is bonded to X.

Examples of preferred structure of $Z^2$ include the following structures.

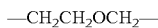

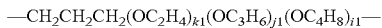

Here, k1 is an integer of 0 to 10, j1 is an integer of 0 to 10, i1 is an integer of 0 to 10, and a molecular weight of $Z^2$ may be 86 to 330. A sequence of repeating units is random regardless of the type. In addition, each repeating unit may not be a simple substance but a mixture of structural isomers. If the molecular weight of $Z^2$ is less than 58, it is difficult for the fluorine-containing acrylic compound to be mixed with a general non-fluorine-based organic solvent, and if it exceeds 330, ability of the fluorine-containing acrylic compound to impart anti-fouling property becomes insufficient.

Examples of particularly preferred structure of $Z^2$ include the following structures, and among them, a structure in which k1 is 1 to 4 and j1 is 1 to 4 is preferable.

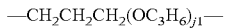

In the above formula (1), X is independently a hydrogen atom or a monovalent organic group containing an acrylic group or an α-substituted acrylic group which may contain at least one selected from an oxygen atom and a nitrogen atom, containing on the average at least one of the monovalent organic group containing an acrylic group or α-substituted acrylic group per molecule, with the proviso that each X's is free of a urethane bond in its structure.

X is preferably a structure having the following formula:

[Chem. 18]

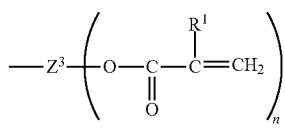

wherein $R^1$ is each independently a hydrogen atom, a fluorine atom, a methyl group, or a trifluoromethyl group, $Z^3$ is a single bond, or a divalent or trivalent hydrocarbon group having 1 to 18 carbon atoms and optionally containing an ether bond and/or an ester bond, and n is 1 or 2.

Here, $R^1$ is each independently a hydrogen atom, a fluorine atom, a methyl group, or a trifluoromethyl group, and a hydrogen atom and a methyl group are preferable.

Also, here, n is 1 or 2, preferably 1.

In addition, here, $Z^3$ is a single bond, or a divalent or trivalent hydrocarbon group having 1 to 18 carbon atoms and optionally containing an ether bond and/or an ester bond. $Z^3$ is preferably a single bond, or the following structures.

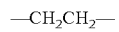

[Chem. 19]

X is preferably a group having the following formula:

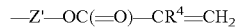

wherein $R^4$ is a hydrogen atom or a methyl group, and Z' is a single bond, a methylene group, an ethylene group, or a propylene group.

As the fluorine-containing acrylic compound having the formula (1), a compound having the following general formula (2) or (3) is preferable.

[Chem. 20]

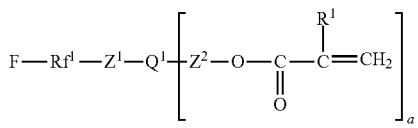 (2)

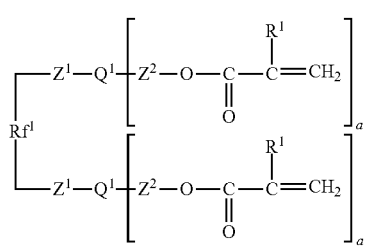 (3)

wherein $Rf^1$, $Z^1$, $Z^2$, $Q^1$, $R^1$ and a are as defined above.

As the fluorine-containing acrylic compound having the formula (1), a fluorine-containing acrylic compound having the following general formula (4) or (5) is further preferable.

[Chem. 21]

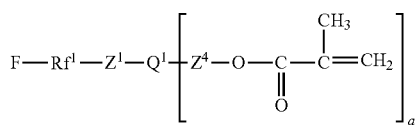  (4)

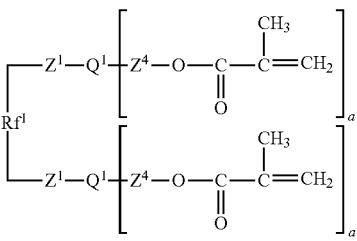  (5)

wherein $Rf^1$, $Z^1$, $Q^1$, and a are as defined above. $Z^4$ is a divalent alkylene ether group having the following formula:

$$-C_oH_{2o}-(OC_3H_6)_{j'}(OC_2H_4)_{k'}(OCH_2)_{l'}-$$

wherein each repeating unit may be linear or branched, the repeating units may be randomly arranged, and j', k', and l' are each independently an integer of 0 to 4, with the proviso that the sum of j', k', and l' is not 0, and o is an integer of 2 to 10.

More specific examples of the fluorine-containing acrylic compound having the formula (1) include those shown below.

[Chem. 22]

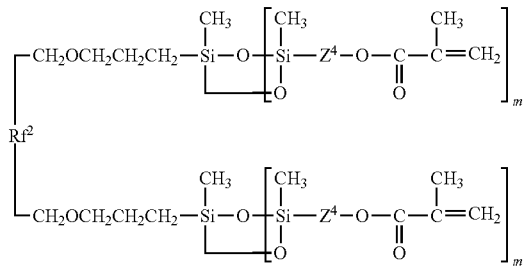

[Chem. 23]

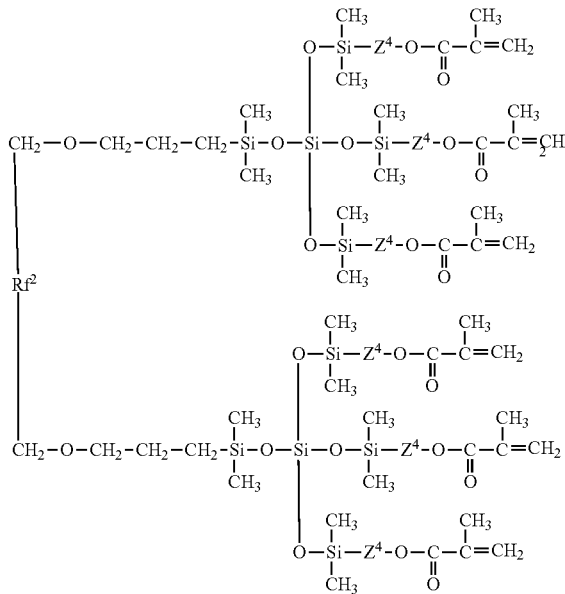

-continued
[Chem. 24]
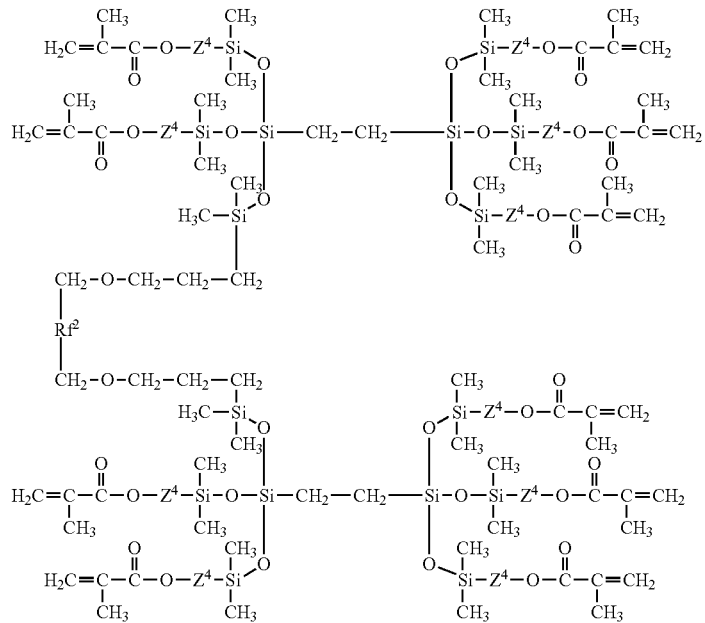
[Chem. 25]
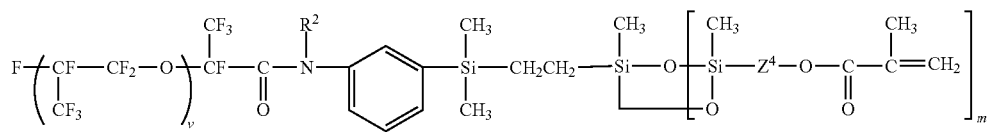
[Chem. 26]
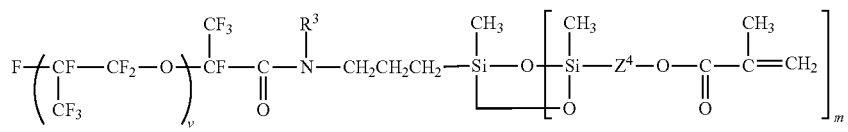
[Chem. 27]
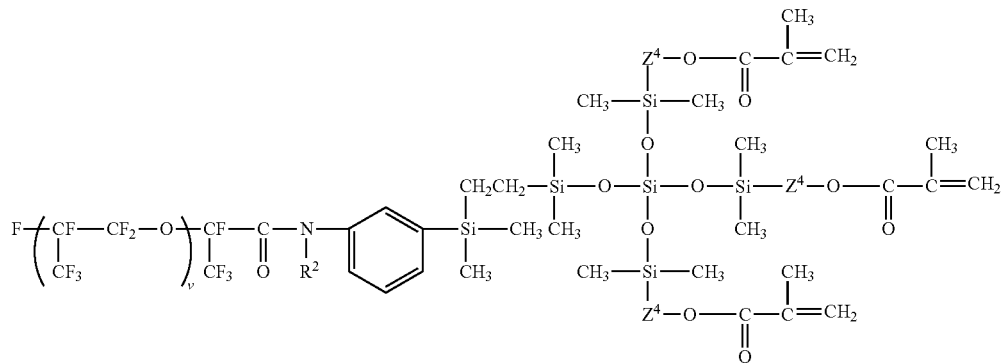

-continued

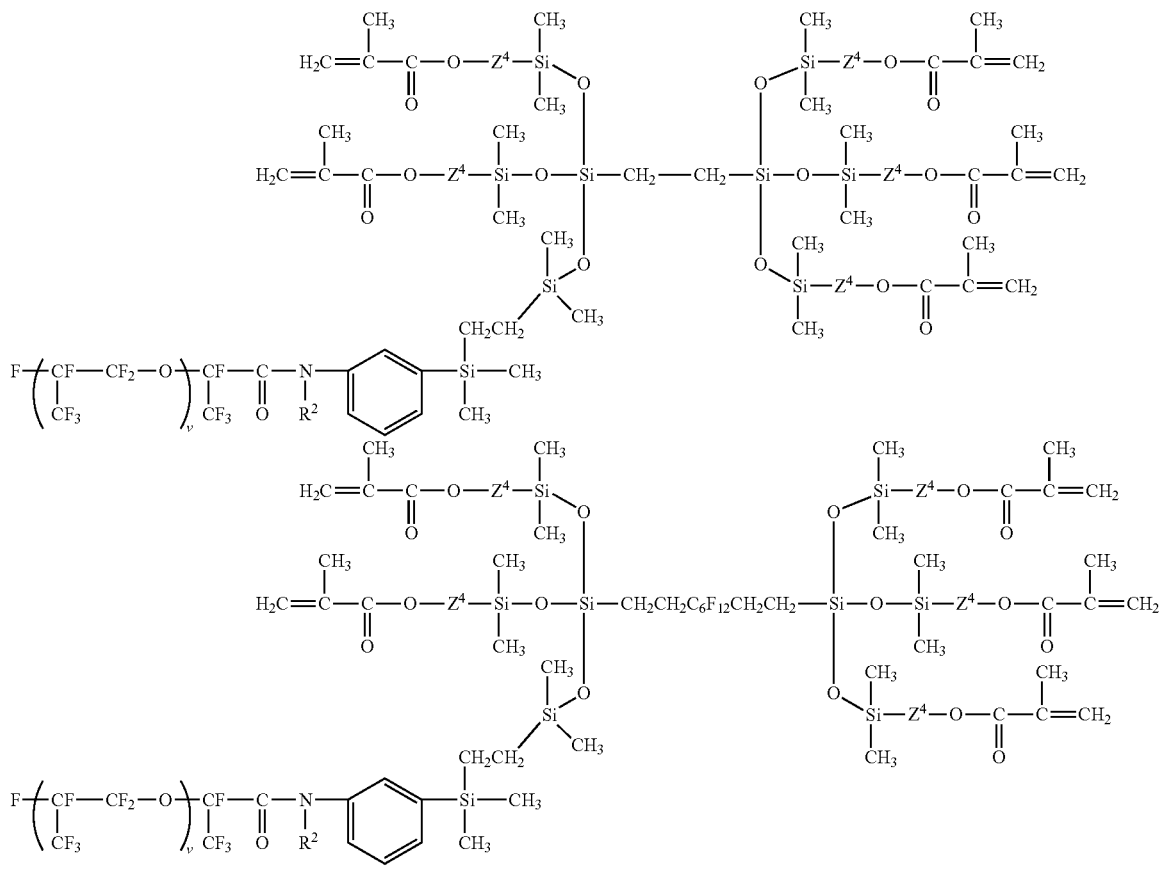

wherein $Rf^2$ is $-CF_2O-(CF_2O)_p(CF_2CF_2O)_q-CF_2-$, and the repeating units enclosed in parentheses ( ) are randomly arranged, m is an integer of 2 to 5, $R^2$ is independently a hydrogen atom or a methyl group, $R^3$ is independently a hydrogen atom, a methyl group, or a phenyl group, p, q, p+q, $Z^4$ and v are as defined above.

Among these, those shown below are particularly preferable.

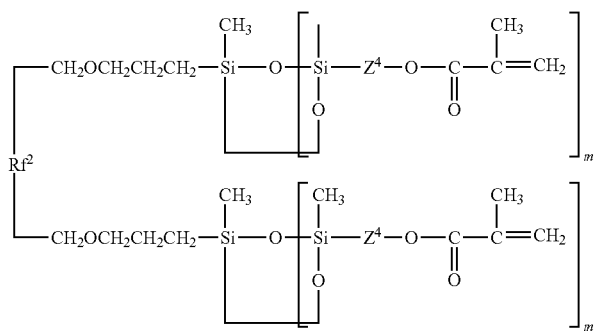

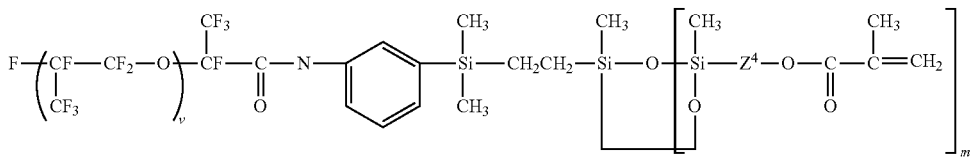

-continued

[Chem. 31]

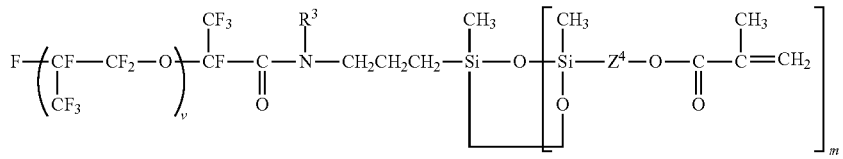

wherein $Rf^2$, m, $R^2$, $R^3$, $Z^4$'s, and v are as defined above.

A method for synthesizing the fluorine-containing acrylic compound having the general formula (1) is not particularly limited, but, for example, as one embodiment of the fluorine-containing acrylic compound having the general formula (2) or (3), the compound can be obtained, first, by hydrosilylation addition reaction of a fluoropolyether compound having a polyfunctional Si—H group represented by the following general formula (6) or (7):

$$F-Rf^1-Z^1-Q^1-[H]_a \quad (6)$$

$$[H]_a-Q^1-Z^1-Rf-Z^1-Q^1-[H]_a \quad (7)$$

wherein $Rf^1$, $Z^1$, $Q^1$ and a are as defined above, and all of a hydrogen atoms (H) enclosed in brackets [ ] in the formulas (6) and (7) are bonded to silicon atoms in the $Q^1$ structure, respectively, a terminal aliphatic unsaturated group having (adjacent to) an alkylene ether group represented by the following general formula (8):

[Chem. 32]

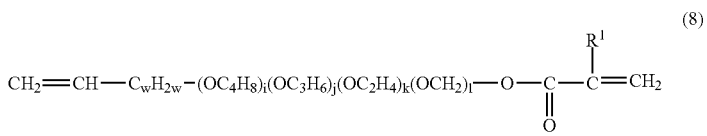

wherein $R^1$, i, j, k, and l are as defined above, and w is an integer of 0 to 8, (for example, an alkyl group containing an aliphatic unsaturated double bond such as an alkenyl group at a terminal, or a terminal alkenyl group), and a compound containing an acrylic group or an α-substituted acrylic group.

Here, examples of the fluoropolyether compounds having a polyfunctional Si—H group of the formulas (6) and (7) include those shown below.

[Chem. 33]

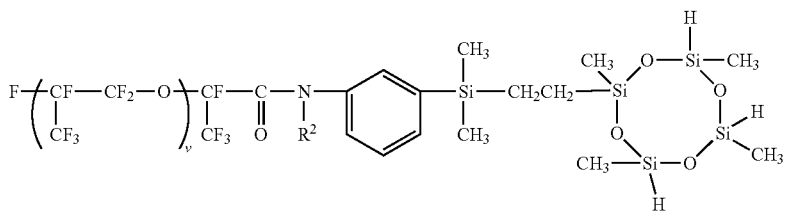

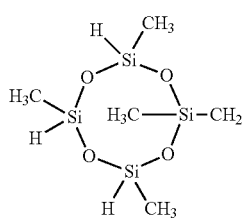 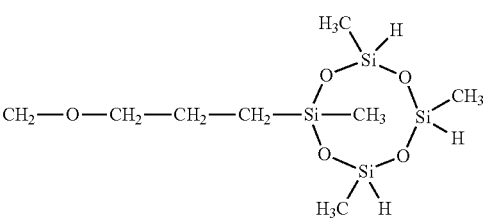

-continued
[Chem. 34]
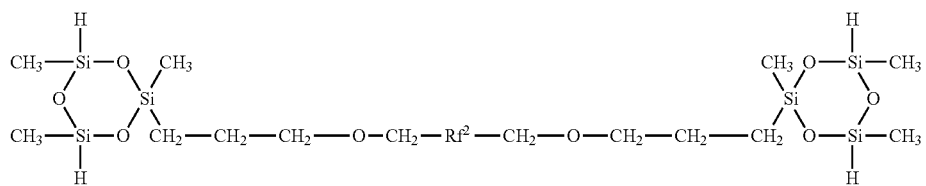
[Chem. 35]
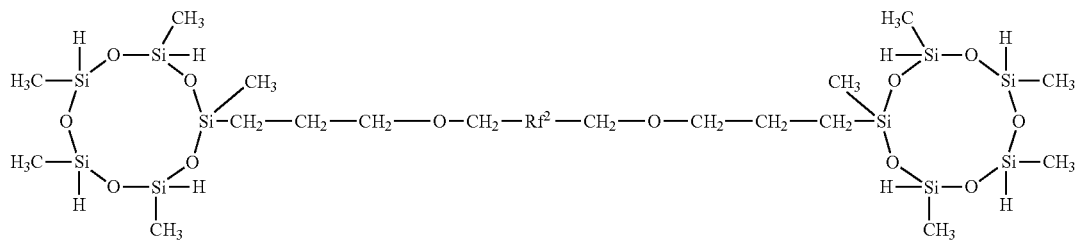
[Chem. 36]
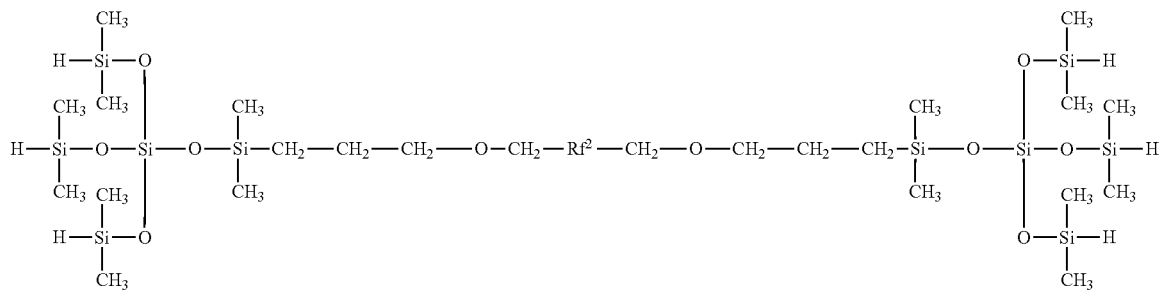
[Chem. 37]
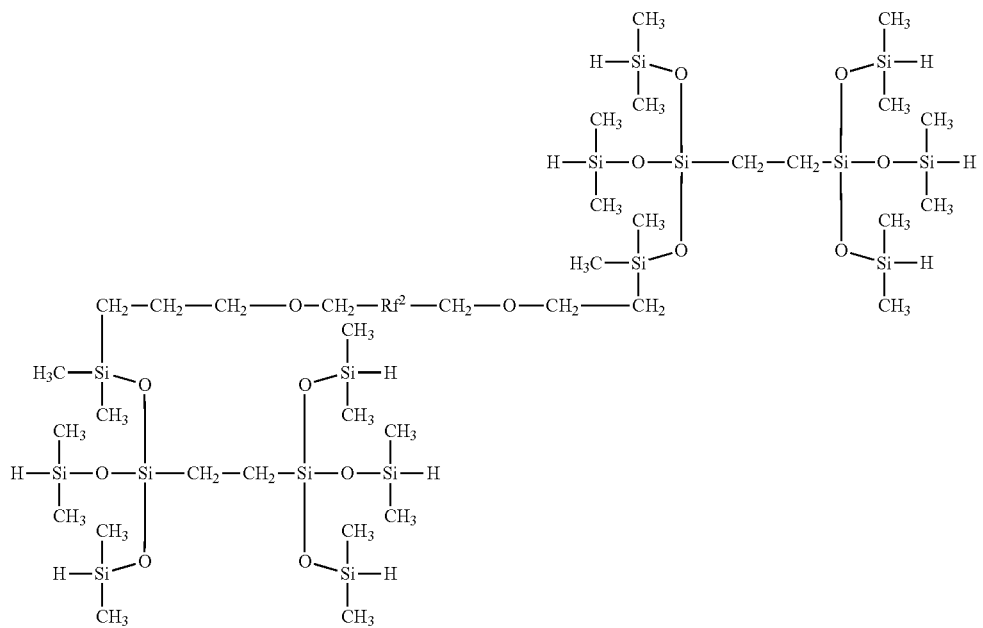

-continued
[Chem. 38]
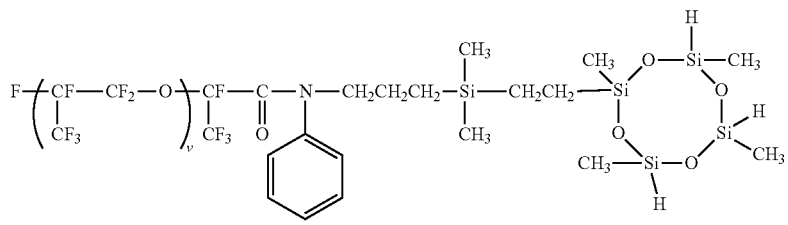
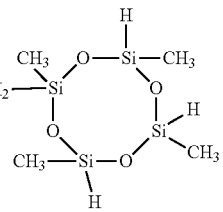
[Chem. 39]
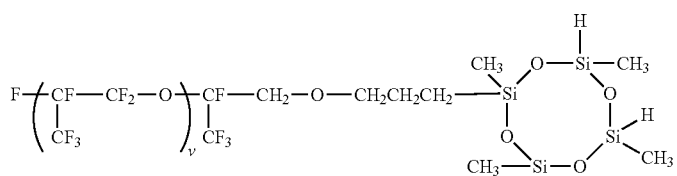
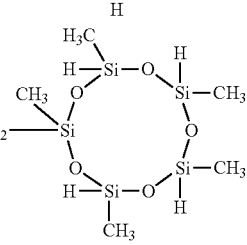
[Chem. 40]
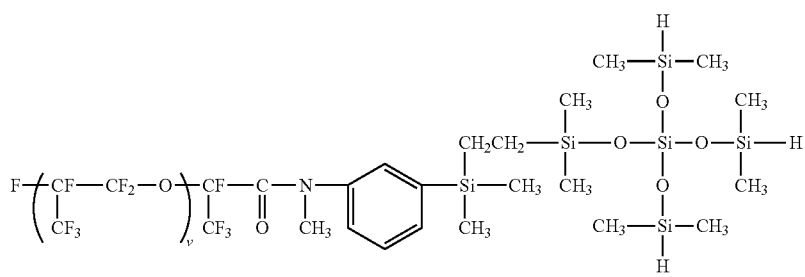
[Chem. 41]
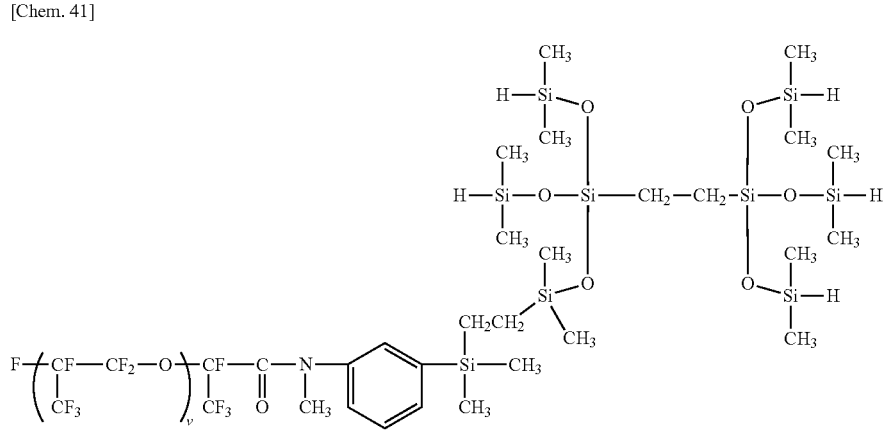
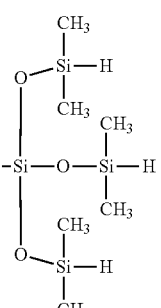

-continued

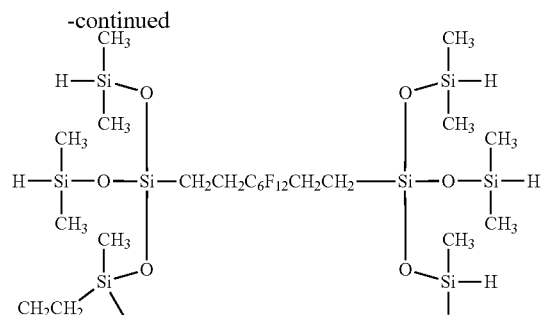
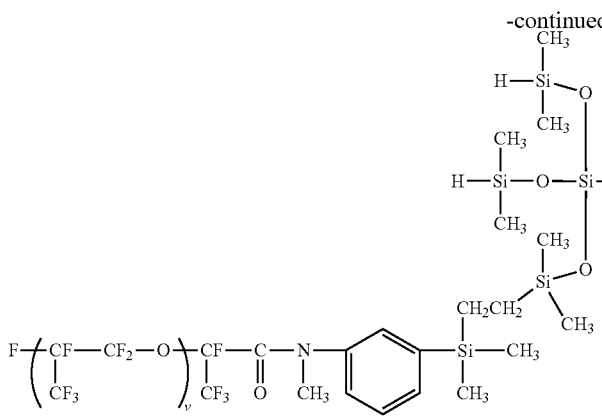

wherein $Rf^2$ and v are the same as described above.

In addition, examples of a compound containing a terminal aliphatic unsaturated group having (adjacent to) an alkylene ether group of the above general formula (8) (for example, an alkyl group containing an aliphatic unsaturated double bond such as an alkenyl group at a terminal, that is, an alkyl group whose terminal is blocked with an external olefin (vinyl group) of $CH_2=CH-$, or the external olefin (vinyl group)), and an acrylic group or an α-substituted acrylic group include the following compounds.

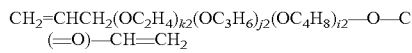
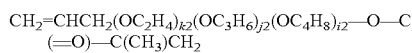
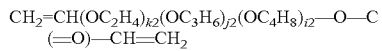
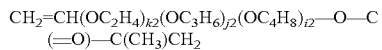

wherein k2 is an integer of 0 to 10, j2 is an integer of 0 to 10, i2 is an integer of 0 to 10, and a molecular weight of a portion corresponding to $CH_2=CH-C_wH_{2w}-(OC_4H_8)_i(OC_3H_6)_j(OC_2H_4)_k(OCH_2)_l-$ in the formula (8) may be 57 to 329. A sequence of repeating units is random regardless of the type. In addition, each repeating unit may not be a simple substance but a mixture of structural isomers.

Among them, the following compounds are particularly preferable.

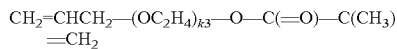
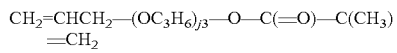

wherein k3 is an integer of 1 to 4, and j3 is an integer of 1 to 4.

Conventionally, when an acrylic group or an α-substituted acrylic group is introduced into a fluorine-containing compound by hydrosilylation addition reaction, allyl methacrylate has been mainly used. However, since an allyl group (terminal aliphatic unsaturated group) in allyl methacrylate has low reactivity in the hydrosilylation addition reaction, the hydrosilylation addition reaction proceeds not only in an intended allyl group (terminal aliphatic unsaturated group) as a reaction site but also in a methacrylic group as a side reaction, which is unsuitable. In the present invention, by using a compound containing a terminal aliphatic unsaturated group having (adjacent to) an alkylene ether group, and an acrylic group or an α-substituted acrylic group, reactivity of the terminal aliphatic unsaturated group is sufficiently secured, so that progress of the hydrosilyl addition of the acrylic group or the α-substituted acrylic group of the side reaction is effectively suppressed.

It is desirable that the fluoropolyether compound having a polyfunctional Si—H group of the formula (6) or (7), and the compound containing a terminal aliphatic unsaturated group of the formula (8), and an acrylic group or an α-substituted acrylic group be mixed and stirred, and reacted at a reaction temperature of 50 to 150° C., preferably 60 to 120° C., for 1 minute to 72 hours, particularly 5 minutes to 12 hours, in the presence of a platinum metal-based addition reaction catalyst. If the reaction temperature is too low, the reaction may be stopped without sufficiently proceeding, and if it is too high, the reaction cannot be controlled due to an increase in temperature due to heat of reaction of hydrosilylation, and bumping, decomposition of raw materials or the like may occur.

In this case, as a preparation ratio of the fluoropolyether compound having a polyfunctional Si—H group of the formula (6) or (7), and the compound containing a terminal aliphatic unsaturated group of the formula (8) and an acrylic group or an α-substituted acrylic group, it is desirable to react using the content of the unsaturated group of the compound containing a terminal aliphatic unsaturated group of the formula (8) and an acrylic group or an α-substituted acrylic group of 0.8 to 5 times moles, particularly 1 to 2 times moles, per a total number of moles of H enclosed in brackets [ ] of the fluoropolyether compound having a polyfunctional Si—H group of the formula (6) or (7). If the amount of the compound containing a terminal aliphatic unsaturated group of the formula (8) and an acrylic group or an α-substituted acrylic group is too small, a large amount of Si—H groups may remain in the fluoropolyether compound having a polyfunctional Si—H group of the formula (6) or (7), and a desired effect may not be obtained. If the amount is more than this, uniformity of the reaction solution is lowered and a reaction rate becomes unstable, and when the compound containing a terminal aliphatic unsaturated group of the formula (8), and an acrylic group or an α-substituted acrylic group is removed after the reaction, it is necessary to make conditions such as heating, pressure reduction and extraction stricter by the amount of excess unreacted component.

As the addition reaction catalyst, for example, a compound containing a platinum group metal such as platinum, rhodium or palladium can be used. Among them, a compound containing platinum is preferable, and hexachloroplatinate(IV) hexahydrate, a platinum carbonylvinylmethyl complex, a platinum-divinyltetramethyldisiloxane complex, a platinum-cyclovinylmethylsiloxane complex, a platinum-octylaldehyde/octanol complex, a complex of chloroplatinic acid and an olefin, an aldehyde, a vinylsiloxane, an acetylene alcohol, or the like, or platinum supported on activated carbon can be used.

A compounding amount of the addition reaction catalyst is such that an amount of contained metal is preferably 0.1 to 5,000 ppm by weight, more preferably 0.1 to 1,000 ppm by weight, per the fluoropolyether compound having a polyfunctional Si—H group of the formula (6) or (7).

The above addition reaction can be carried out without the presence of a solvent, but may be diluted with a solvent as necessary. At this time, as the diluent solvent, a widely and generally used organic solvent such as toluene, xylene or isooctane can be used. As such an organic solvent, it is preferable that the fluorine-containing acrylic compound having the formula (2) or (3), which has a boiling point equal to or higher than a target reaction temperature, does not inhibit the reaction, and is produced after the reaction, is soluble at the reaction temperature. For example, a partially fluorine-modified solvent such as a fluorine-modified aromatic hydrocarbon-based solvent such as m-xylene hexafluoride or benzotrifluoride, or a fluorine-modified ether-based solvent such as methyl perfluorobutyl ether is desirable, and m-xylene hexafluoride is particularly preferable.

When the solvent is used, a use amount thereof is preferably 5 to 2,000 parts by weight, more preferably 50 to 500 parts by weight, per 100 parts by weight of the fluoropolyether compound having a polyfunctional Si—H group of the formula (6) or (7). If it is less than this, an effect of dilution by the solvent is low, and if it is more, the degree of dilution becomes too high, and the reaction rate may be lowered.

After completion of the reaction, the unreacted compound containing a terminal aliphatic unsaturated group of the formula (8) and an acrylic group or an α-substituted acrylic group, and the diluent solvent are removed by a known method such as distillation under reduced pressure, extraction, and adsorption, whereby the fluorine-containing acrylic compound having the formula (2) or (3) can be obtained.

The fluorine-containing acrylic compound having the general formula (1) obtained by the above reaction is subjected to purification and isolation operations such as concentration, column purification, distillation, and extraction, and the reaction solution can also be used as it is as a mixture containing the fluorine-containing acrylic compound having the general formula (1) or further diluted with an organic solvent or the like.

One embodiment of the present invention is a fluorine-containing active energy ray-curable composition characterized by comprising 0.005 to 40 parts by weight, preferably 0.01 to 20 parts by weight of the fluorine-containing acrylic compound of the first embodiment of the present invention per 100 parts by weight of the active energy ray-curable composition described later. If the amount blended of the compound is further reduced, the compound cannot be sufficiently disposed on the surface when a cured product is formed, and expected liquid repellency and anti-fouling property cannot be exhibited. If it is larger than the amount, an influence of the fluorine-containing acrylic compound on strength and hardness of the cured product layer becomes too large, and cured product characteristics of the original active energy ray-curable composition are lost.

The active energy ray-curable composition used in one embodiment of the present invention is not particularly limited as long as it gives a cured product by irradiation with an active energy ray such as an ultraviolet ray or an electron beam, and it is particularly preferable to contain a non-fluorine-based acrylic compound (a) and a photopolymerization initiator (b).

The non-fluorine-based acrylic compound (a) can be used regardless of whether it is monofunctional or polyfunctional. In particular, it is preferable to contain an acrylic compound having two or more acrylic groups in one molecule.

As such an acrylic compound, one having two or more acrylic groups or α-substituted acrylic groups in one molecule can be used, and suitable examples thereof include di- to hexa-functional (meth)acrylic compounds such as 1,6-hexanediol di(meth)acrylate, neopentyl glycol di(meth)acrylate, ethylene glycol di(meth)acrylate, ethylene oxide isocyanurate-modified di(meth)acrylate, EO-isocyanurate modified tri(meth)acrylate, trimethylolpropane tri(meth)acrylate, pentaerythritol tri(meth)acrylate, glycerol tri(meth)acrylate, tris(meth)acryloyloxyethyl phosphate, (2,2,2-tri(meth)acryloyloxymethyl)ethyl hydrogen phthalate, glycerol tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate and sorbitol hexa(meth)acrylate, epoxy acrylates obtained by adding these (meth)acrylic compounds to ethylene oxide, propylene oxide, epichlorohydrin, fatty acid, alkyl-modified products, or an epoxy resin, copolymers obtained by introducing a (meth)acryloyl group into a side chain of an acrylic acid ester copolymer, and the like.

Moreover, urethane acrylates, products obtained by reacting polyisocyanate with a (meth)acrylate having a hydroxyl group, products obtained by reacting polyisocyanate and a polyester of a terminal diol with a (meth)acrylate having a hydroxyl group, products obtained by reacting polyisocyanate obtained by reacting a polyol with an excess amount of diisocyanate with a (meth)acrylate having a hydroxyl group, and the like can also be used. Among them, suitable examples thereof include urethane acrylates obtained by reacting a (meth)acrylate having a hydroxyl group selected from 2-hydroxyethyl(meth)acrylate, 2-hydroxy-3-acryloyloxypropylmethacrylate, and pentaerythritol triacrylate with a polyisocyanate selected from hexamethylene diisocyanate, isophorone diisocyanate, tolylene diisocyanate, lysine diisocyanate, norbornane diisocyanate, 1,3-bis(isocyanatomethyl) cyclohexane, methylene bis(4-cyclohexyl isocyanate), 2-methyl-1,3-diisocyanatocyclohexane, 2-methyl-1,5-diisocyanatocyclohexane, and diphenylmethane diisocyanate, and the like.

In addition, it may be a polyfunctional acrylic compound having two or more acrylic groups or α-substituted acrylic groups in one molecule, but free of a urethane bond, or a mixture of at least two kinds of acrylic compounds including said polyfunctional acrylic compound and one of polyfunctional urethane acrylates having three or more acrylic groups or α-substituted acrylic groups in one molecule obtained by reacting an aliphatic polyisocyanate with a hydroxy-containing acrylic compound.

In this case, examples of the polyfunctional acrylic compound having two or more acrylic groups or α-substituted acrylic groups in one molecule, but free of a urethane bond include trimethylolpropane tri(meth)acrylate, pentaerythritol tri(meth)acrylate, glycerol tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate, sorbitol hexa(meth)

acrylate, and the foregoing compounds modified with ethylene oxide or propylene oxide.

In addition, examples of the polyfunctional urethane acrylates having three or more acrylic groups or α-substituted acrylic groups in one molecule, which is obtained by reacting an aliphatic polyisocyanate with a hydroxy-containing acrylic compound include products which are obtained from reaction of a di- or polyfunctional polyisocyanate (obtained by reacting any one of hexamethylene diisocyanate, norbornane diisocyanate, isophorone diisocyanate, and trimers thereof, and di- and trifunctional isocyanates thereof, with an aliphatic diol or aliphatic polyol), with any one of a polyacrylate having a hydroxy group on a side chain, trimethylolpropane di(meth)acrylate, glycerin di(meth)acrylate, bis(2-(meth)acryloyloxyethyl)hydroxyethyl isocyanurate, pentaerythritol tri(meth)acrylate, ditrimethylolpropane tri(meth)acrylate, dipentaerythritol penta(meth)acrylate, and the foregoing compounds modified with ethylene oxide or propylene oxide; and products which are obtained from reaction of an aliphatic polyol, a polyacrylate having a hydroxy group on a side chain, and an acrylic compound having an isocyanate group such as 2-isocyanatoethyl (meth)acrylate or 1,1-bis(acryloyloxymethyl)ethyl isocyanate.

Furthermore, the component (a) may include not only a liquid component but also a component obtained by modifying a surface of a particulate high-molecular-weight body or a surface of inorganic filler fine particles with an acrylic group.

The component (a) as described above can be used alone, but it can also be used by blending a plurality of corresponding compounds in order to enhance coatability and characteristics of the coating film after curing.

In addition, by containing a photopolymerization initiator as the component (b), a curable composition having enhanced curability when ultraviolet rays are used as active energy rays can be obtained.

The photopolymerization initiator as the component (b) is not particularly limited as long as it can cure the acrylic compound by ultraviolet irradiation, and preferably, examples thereof include acetophenone, benzophenone, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-methyl-1-(4-methylthiophenyl)-2-morpholinopropan-1-one, 2-benzyl-2-dimethylamino-1-(4-morpholinophenyl)-butan-1-one, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, 1,2-octanedione-1-[4-(phenylthio)-2-(O-benzoyloxime)], ethanone-1-[9-ethyl-6-(2-methylbenzoyl)-9H-carbazol-3-yl]-1-(O-acetyloxime), 2-hydroxy-1-{4-[4-(2-hydroxy-2-methylpropionyl)benzyl]phenyl}-2-methylpropan-1-one, and the like, and one kind thereof may be used alone or two or more kinds thereof may be used in combination.

The content of the component (b) can be appropriately determined according to curing conditions and physical properties of the cured product of the intended active energy ray-curable composition, but for example, it is desirable that the content be 0.1 to 15 parts by weight, particularly 1 to 10 parts by weight, per 100 parts by weight of the total of the component (a). If the added amount is smaller than this, curability may be deteriorated, and if it is larger than this, an influence on physical properties after curing may be increased.

To the active energy ray-curable composition, an active energy ray-reactive compound other than an acrylic group, such as a thiol compound or a maleimide compound, an organic solvent, a polymerization inhibitor, an antistatic agent, an antifoaming agent, a viscosity modifier, a light resistant stabilizer, a heat resistant stabilizer, an antioxidant, a surfactant, a colorant, a polymer or inorganic filler, and the like can be also blended. The structure thereof is not particularly limited, and known ones can be used without impairing the object of the present invention.

Also, as the active energy ray-curable composition, as an active energy ray-curable composition in which the components (a) and (b) and various additives are blended, existing compositions commercially available in classification of paint, ink, hard coating agent and the like from each company may be used as a part or whole of the active energy ray-curable composition. Even when a commercially available hard coating agent is used as described above, an organic solvent, a polymerization inhibitor, an antistatic agent, an antifoaming agent, a viscosity modifier, a light resistant stabilizer, a heat resistant stabilizer, an antioxidant, a surfactant, a colorant, a filler, and the like can be additionally blended according to the purpose.

In addition, since the fluorine-containing acrylic compound of the present invention is excellent in compatibility with a non-fluorine-based organic solvent, it is not necessary to add a volatile fluorine compound as a compatibilizer in preparation of the fluorine-containing active energy ray-curable composition. Therefore, for example, even when the content of the volatile fluorine compound is 1 part by weight or less (0 to 1 parts by weight), particularly 0.1 parts by weight or less (0 to 0.1 parts by weight) per 100 parts by weight of the above-described active energy ray-curable composition, a uniform fluorine-containing active energy ray-curable composition can be prepared.

Since the fluorine-containing active energy ray-curable composition of the present invention obtained as described above contains a fluorine-containing acrylic compound having a perfluoropolyether group as a water/oil-repellent group and an acrylic group or an α-substituted acrylic group as an active energy ray-curable group, the fluorine-containing active energy ray-curable composition gives a cured product excellent in water repellency, oil repellency, slip property, anti-fouling property, fingerprint wiping property, low refractive index property, solvent resistance, chemical resistance, and the like, and since the fluorine-containing acrylic compound is free of a urethane bond in a molecule, a cured product excellent in abrasion resistance is obtained. Further, it is also suitable as an intermediate of a formulation that imparts those functions.

Furthermore, the present invention provides an article obtained by applying the above-described fluorine-containing active energy ray-curable composition of the present invention to a surface of a substrate and curing the fluorine-containing active energy ray-curable composition (article having a cured product layer (also referred to as a cured coating film and a cured resin layer) on a surface thereof). As described above, if the fluorine-containing active energy ray-curable composition of the present invention is used, a cured coating film (cured resin layer) having excellent surface characteristics can be formed on the surface of the substrate. In particular, it is useful for imparting water repellency, oil repellency, and anti-fouling property to a surface of acrylic hard coat. This makes it difficult for human fat such as fingerprints, sebum and sweat, stain due to cosmetics and the like to adhere, and a hard coat surface excellent in wiping property can be provided to a substrate (article). Therefore, the fluorine-containing active energy ray-curable composition of the present invention can provide a coating film or a protective film for a surface of a substrate (article) that may be stained by human fat, cosmetics or the like when touched by a human body.

The cured coating film (cured resin layer) formed using the fluorine-containing active energy ray-curable composition of the present invention can impart characteristics to various articles by directly applying the composition to the surface of an article to which characteristics are imparted and curing the composition, or by applying the fluorine-containing active energy ray-curable composition of the present invention on various substrate films (for example, a film of polyethylene, polypropylene, polyethylene terephthalate, polyethylene naphthalate, a vinyl chloride resin, polystyrene, an acrylic resin, polycarbonate, polyphenylene sulfide, polyether ether ketone, polyether sulfone, aramid, polyimide, or the like) to prepare a cured coating film and attaching the film to the surface of a target article.

Here, the method for applying the fluorine-containing active energy ray-curable composition of the present invention is not particularly limited, and for example, a known coating method such as roll coating, gravure coating, flow coating, dip coating, spray coating, spin coating, bar coating, or screen printing can be used. After coating, the coating film is irradiated with an active energy ray to be cured. Here, as the active energy ray, any beam such as an electron beam or an ultraviolet ray can be used, and an ultraviolet ray is particularly preferable. As an ultraviolet ray source, a mercury lamp, a metal halide lamp, and an LED lamp are suitable. An ultraviolet irradiation dose is desirably in the range of 10 to 10,000 $mJ/cm^2$, particularly 20 to 4,000 $mJ/cm^2$, because if it is too small, an uncured component remains, and if it is too large, the coating film and the substrate may be deteriorated. In addition, in order to prevent curing inhibition by oxygen, irradiation atmosphere may be replaced with an inert gas free of oxygen molecules such as nitrogen, carbon dioxide or argon at the time of ultraviolet irradiation, the surface of the coating film may be covered with an ultraviolet-permeable protective layer having releasability, and the coating film surface may be irradiated with ultraviolet ray from above, or in a case where the substrate has ultraviolet permeability, the surface of the coating film may be covered with a releasable protective layer, and then the coating film surface may be irradiated with ultraviolet ray from the side opposite to the coated surface of the substrate. In order to effectively perform leveling of the coating film or polymerization of the acrylic group in the coating film, the coating film and the substrate may be heated by an arbitrary method such as a hot air drying furnace before and during ultraviolet irradiation.

Further, the thickness of the cured coating film (cured resin layer) formed using the fluorine-containing active energy ray-curable composition of the present invention is not particularly limited, but it is usually preferably 5 nm to 100 μm, and particularly preferably 1 μm to 20 μm, in that sufficient surface hardness cannot be obtained when the obtained film thickness is too thin, and mechanical strength of the hard coat film decreases and cracks are easily generated if it is too thick.

Furthermore, the cured coating film (cured resin layer) formed using the fluorine-containing active energy ray-curable composition of the present invention desirably has a water contact angle at 25° C. and a relative humidity of 40% of 90° or more, preferably 950 or more. In the present invention, the water contact angle is a value measured under a condition of droplet: 2 μl using a contact angle meter Drop Master (manufactured by Kyowa Interface Science Co., Ltd.). Also, in order to obtain the above water contact angle, it is preferable that the fluorine-containing active energy ray-curable composition is uniformly mixed.

It is useful as a coating film and a surface protective film for articles, for example, housings of various devices carried by a person's hand, such as tablet computers, portable (communication) information terminals such as mobile phones and smartphones, notebook PCs, digital media players, watch-type and glasses-type wearable computers, digital cameras, digital video cameras, and electronic book readers; various flat panel displays such as liquid crystal displays, plasma displays, organic EL displays, back projection displays, vacuum fluorescent displays (VFD), field emission projection displays, CRT, and toner-based displays, and display operation device surfaces such as screens of TVs, exterior of automobiles, glossy surfaces of piano and furniture, surfaces of building stone such as marble, decorative building materials of water section such as toilet, bath, and washroom, protective glass for art exhibition, window glass for show windows, showcases, covers for photo frames, glass for wristwatch, automobile windows, window glass for trains, aircrafts and the like, transparent glass or transparent plastic (acryl, polycarbonate, and the like) members such as automobile headlights and tail lamps, various mirror members, and the like.

In particular, it is useful as a surface protective film for various devices having a display input device that performs an operation on a screen with a finger or a palm of a person, such as touch panel displays, for example, tablet computers, notebook PCs, watch-type wearable computers, activity meters, portable (communication) information terminals such as mobile phones and smartphones, digital media players, electronic book readers, digital photo frames, game machines or controllers of game machines, digital cameras, digital video cameras, navigation devices for automobiles and the like, automated teller machines, automatic cash dispensers, automatic vending machines, digital signage (electronic signage), security system terminals, POS terminals, various controllers such as remote controllers, display input devices such as panel switches for in-vehicle devices, and the like.

Furthermore, the cured coating film formed from the fluorine-containing active energy ray-curable composition of the present invention is also useful as a surface protective film for optical recording media such as magneto-optical disk or optical disk; optical components and optical devices such as eyeglass lenses, camera lenses, projector lens prisms, lens sheets, pellicle films, polarizing plates, optical filters, lenticular lenses, Fresnel lenses, antireflection films, optical fibers and optical couplers, or as a surface protective film for various protective components of these devices.

EXAMPLES

Hereinafter, the present invention is described specifically with reference to Synthesis Examples, Examples and Comparative Examples, but the present invention is not limited to the following Examples.

[Synthesis Example 1] Synthesis of Fluorine-Containing Acrylic Compound (A)

A 2,000 mL three-necked flask equipped with a reflux device and a stirrer was charged under a dry nitrogen atmosphere with 500 g (0.12 mol) of perfluoropolyether having the following formula:

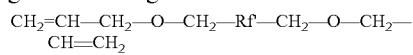

Rf: —$CF_2O(CF_2O)_{p1}(CF_2CF_2O)_{q1}CF_2$—

($q1/p1 = 0.9$, $p1+q1 \approx 45$, numerical average molecular weight calculated from $^{19}$F-NMR$\approx$4300), 700 g of m-xylene hexafluoride, and 361 g (1.50 mol) of tetramethylcyclotetrasiloxane, and heated to 90° C. while stirring the mixture. Thereto was charged 0.442 g of a toluene solution of a platinum/1,3-divinyl-tetramethyldisiloxane complex (containing $1.1 \times 10^{-6}$ mol as Pt alone), and stirring was continued for 4 hours while internal temperature was maintained at 90° C. or more. After confirming disappearance of the allyl group of raw material by $^1$H-NMR, the solvent and excess tetramethylcyclotetrasiloxane were distilled off under reduced pressure. Thereafter, activated carbon treatment was performed to obtain 498 g of a colorless and transparent liquid compound (a) having the following formula:

[Chem. 42]

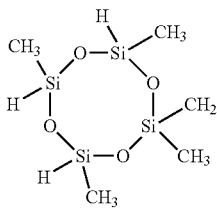 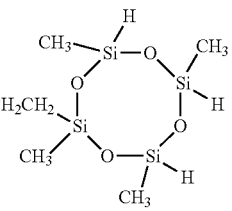

Rf': —$CF_2O(CF_2O)_{p1}(CF_2CF_2O)_{q1}CF_2$—

($q1/p1=0.9$, $p1+q1\approx45$, numerical average molecular weight calculated from $^{19}$F-NMR$\approx$4800).

Under a dry air atmosphere, 3.2 g ($1.88 \times 10^{-2}$ mol) of allyloxyethyl methacrylate, 10.0 g of m-xylene hexafluoride, and $1.0 \times 10^{-2}$ g of a toluene solution of a chloroplatinic acid/vinylsiloxane complex (containing $0.3 \times 10^{-7}$ mol as Pt alone) were mixed with 10.0 g (Si—H group amount: $1.3 \times 10^{-2}$ mol) of the compound (a) obtained above, and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 10.4 g of a colorless and transparent fluorine-containing acrylic compound (A) having the following formula:

[Chem. 43]

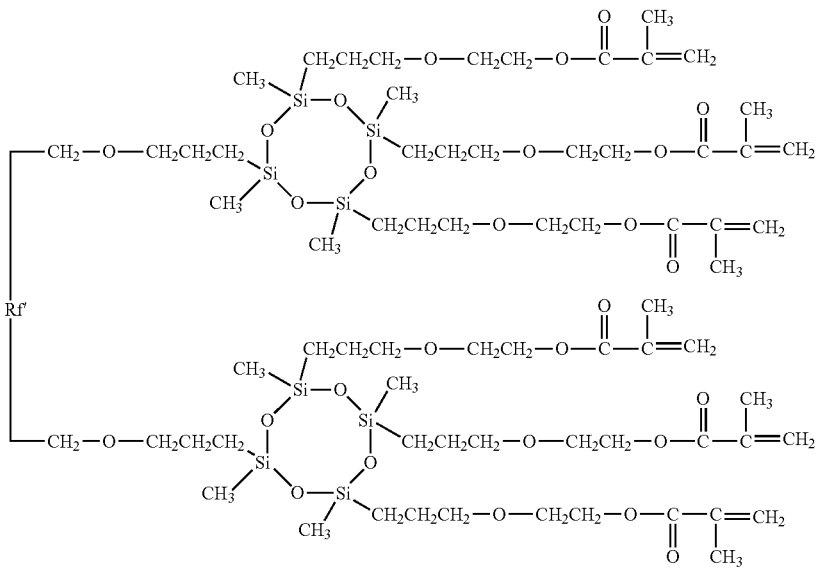

Rf': —$CF_2O(CF_2O)_{p1}(CF_2CF_2O)_{q1}CF_2$—

($q1/p1=0.9$, $p1+q1\approx45$).

[Synthesis Example 2] Synthesis of Fluorine-Containing Acrylic Compound (B)

A 1,000 mL three-necked flask equipped with a reflux device and a stirrer was charged under a dry nitrogen atmosphere with 188 g (0.10 mol) of perfluoropolyether having the following formula:

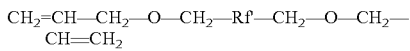

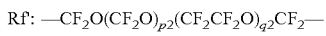

($q2/p2=1.3$, $p2+q2 \approx 16$, numerical average molecular weight calculated from $^{19}$F-NMR$\approx$1800), 188 g of m-xylene hexafluoride, and 361 g (1.50 mol) of tetramethylcyclotetrasiloxane, and heated to 90° C. while stirring the mixture. Thereto was charged 0.442 g of a toluene solution of a platinum/1,3-divinyl-tetramethyldisiloxane complex (containing $1.1 \times 10^{-6}$ mol as Pt alone), and stirring was continued for 4 hours while internal temperature was maintained at 90° C. or more. After confirming disappearance of the allyl group of raw material by $^1$H-NMR, the solvent and excess tetramethylcyclotetrasiloxane were distilled off under reduced pressure. Thereafter, activated carbon treatment was performed to obtain 192 g of a colorless and transparent liquid compound (b) having the following formula:

[Chem. 44]

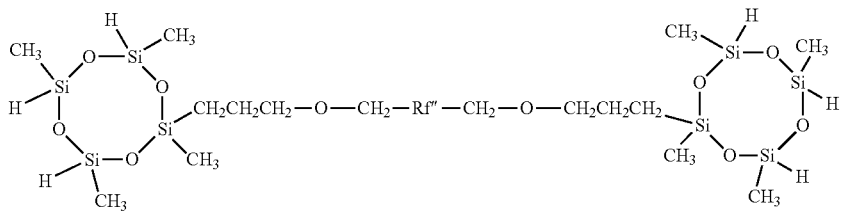

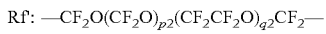

($q2/p2=1.3$, $p2+q2 \approx 16$, numerical average molecular weight calculated from $^{19}$F-NMR$\approx$2300).

Under a dry air atmosphere, 5.1 g ($2.60 \times 10^{-2}$ mol) of allyloxyethyl methacrylate, 10.0 g of m-xylene hexafluoride, and $2.0 \times 10^{-2}$ g of a toluene solution of a chloroplatinic acid/vinylsiloxane complex (containing $0.6 \times 10^{-7}$ mol as Pt alone) were mixed with 10.0 g (Si—H group amount: $2.6 \times 10^{-2}$ mol) of the compound (b) obtained above, and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 11.6 g of a colorless and transparent fluorine-containing acrylic compound (B) having the following formula:

[Chem. 45]

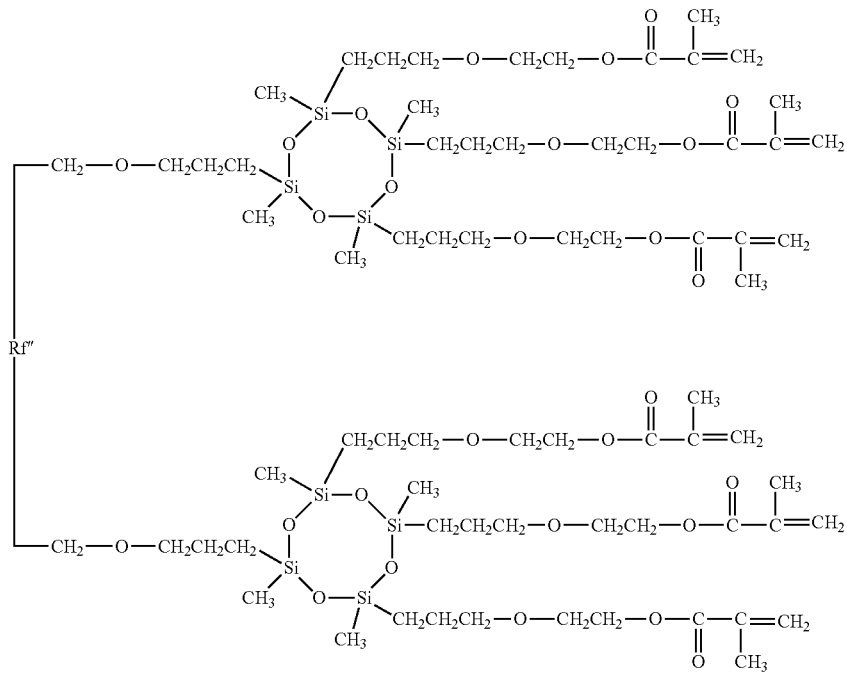

Rf: —CF$_2$O(CF$_2$O)$_{p2}$(CF$_2$CF$_2$O)$_{q2}$CF$_2$—

(q2/p2=1.3, p2+q2≈16).

[Synthesis Example 3] Synthesis of Fluorine-Containing Acrylic Compound (C)

A 2,000 mL three-necked flask equipped with a reflux device and a stirrer was charged under a dry nitrogen atmosphere with 500 g (0.12 mol) of perfluoropolyether having the following formula:

CH$_2$=CH—CH$_2$—O—CH$_2$—Rf'—CH$_2$—O—CH$_2$—CH=CH$_2$

Rf': —CF$_2$O(CF$_2$O)$_{p1}$(CF$_2$CF$_2$O)$_{q1}$CF$_2$—

(q1/p1=0.9, p1+q1≈45, numerical average molecular weight calculated from $^{19}$F-NMR≈4300), 700 g of m-xylene hexafluoride, and 451 g (1.50 mol) of pentamethylcyclopentasiloxane, and heated to 90° C. while stirring the mixture. Thereto was charged 0.442 g of a toluene solution of a platinum/1,3-divinyl-tetramethyldisiloxane complex (containing 1.1×10$^{-6}$ mol as Pt alone), and stirring was continued for 4 hours while internal temperature was maintained at 90° C. or more. After confirming disappearance of the allyl group of raw material by $^1$H-NMR, the solvent and excess pentamethylcyclopentasiloxane were distilled off under reduced pressure. Thereafter, activated carbon treatment was performed to obtain 511 g of a colorless and transparent liquid compound (c) having the following formula:

[Chem. 46]

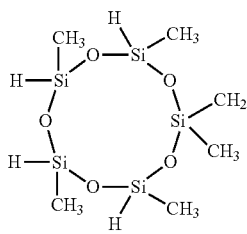CH$_2$CH$_2$CH$_2$—O—CH$_2$—Rf'—CH$_2$—O—CH$_2$CH$_2$CH$_2$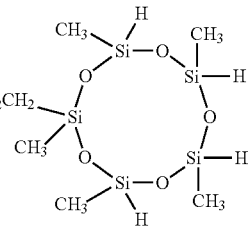

Rf': —CF$_2$O(CF$_2$O)$_{p1}$(CF$_2$CF$_2$O)$_{q1}$CF$_2$—

(q1/p1=0.9, p1+q1≈45, numerical average molecular weight calculated from $^{19}$F-NMR≈4900).

Under a dry air atmosphere, 4.2 g (2.44×10$^{-2}$ mol) of allyloxyethyl methacrylate, 10.0 g of m-xylene hexafluoride, and 1.0×10$^{-2}$ g of a toluene solution of a chloroplatinic acid/vinylsiloxane complex (containing 0.3×10$^{-7}$ mol as Pt alone) were mixed with 10.0 g (Si—H group amount: 1.6×10$^{-2}$ mol) of the compound (c) obtained above, and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 10.1 g of a colorless and transparent fluorine-containing acrylic compound (C) having the following formula:

[Chem. 47]

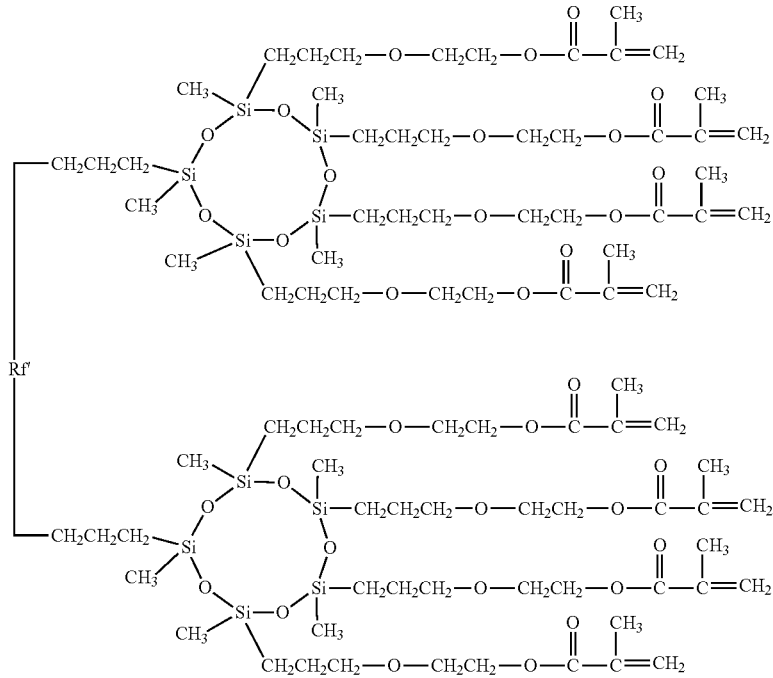

Rf: —$CF_2O(CF_2O)_{p1}(CF_2CF_2O)_{q1}CF_2$—

(q1/p1=0.9, p1+q1≈45).

[Synthesis Example 4] Synthesis of Fluorine-Containing Acrylic Compound (D)

A 1,000 mL three-necked flask equipped with a reflux device and a stirrer was charged under a dry nitrogen atmosphere with 188 g (0.10 mol) of perfluoropolyether having the following formula:

[Chem. 48]

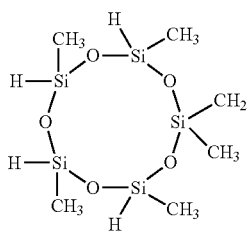 $CH_2CH_2CH_2$—O—$CH_2$—Rf''—$CH_2$—O—$CH_2CH_2CH_2$ 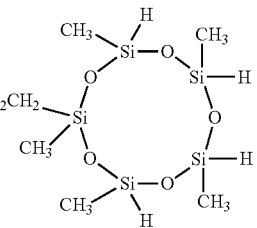

$CH_2$=$CH$—$CH_2$—O—$CH_2$—Rf'—$CH_2$—O—$CH_2$—$CH$=$CH_2$

Rf': —$CF_2O(CF_2O)_{p2}(CF_2CF_2O)_{q2}CF_2$—

(q2/p2=1.3, p2+q2≈16, numerical average molecular weight calculated from $^{19}$F-NMR≈1800), 188 g of m-xylene hexafluoride, and 451 g (1.50 mol) of pentamethylcyclopentasiloxane, and heated to 90° C. while stirring the mixture. Thereto was charged 0.442 g of a toluene solution of a platinum/1,3-divinyl-tetramethyldisiloxane complex (containing $1.1 \times 10^{-6}$ mol as Pt alone), and stirring was continued for 4 hours while internal temperature was maintained at 90° C. or more. After confirming disappearance of the allyl group of raw material by $^1$H-NMR, the solvent and excess pentamethylcyclopentasiloxane were distilled off under reduced pressure. Thereafter, activated carbon treatment was performed to obtain 199 g of a colorless and transparent liquid compound (d) having the following formula:

Rf': —$CF_2O(CF_2O)_{p2}(CF_2CF_2O)_{q2}CF_2$—

(q2/p2=1.3, p2+q2≈16, numerical average molecular weight calculated from $^{19}$F-NMR≈2400).

Under a dry air atmosphere, 8.7 g ($5.11 \times 10^{-2}$ mol) of allyloxyethyl methacrylate, 10.0 g of m-xylene hexafluoride, and $2.0 \times 10^{-2}$ g of a toluene solution of a chloroplatinic acid/vinylsiloxane complex (containing $0.6 \times 10^{-7}$ mol as Pt alone) were mixed with 10.0 g (Si—H group amount:

$3.3\times10^{-2}$ mol) of the compound (d) obtained above, and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 11.6 g of a colorless and transparent fluorine-containing acrylic compound (D) having the following formula:

[Chem. 49]

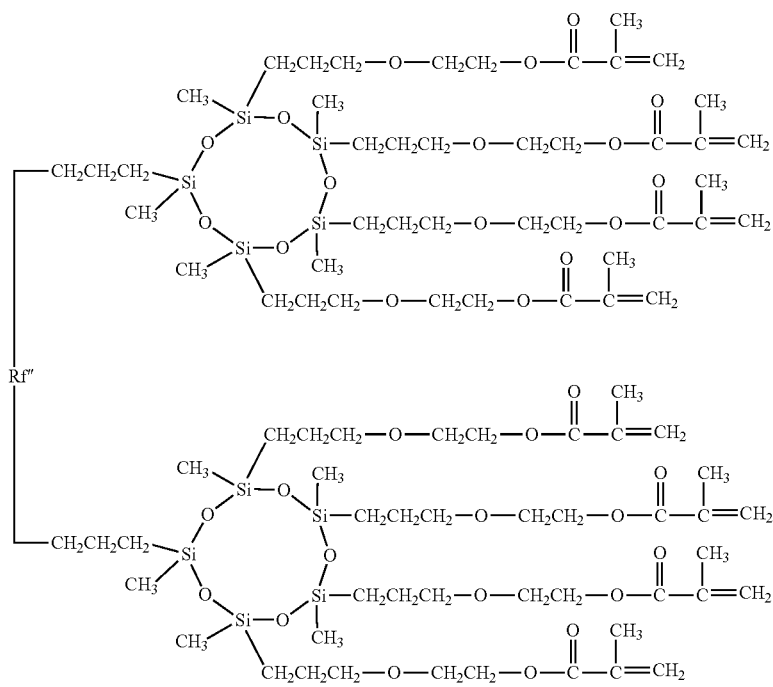

Rf': —$CF_2O(CF_2O)_{p2}(CF_2CF_2O)_{q2}CF_2$—
(q2/p2=1.3, p2+q2≈16).

[Synthesis Example 5] Synthesis of Fluorine-Containing Acrylic Compound (E)

A 100 mL four-necked flask equipped with a reflux device and a stirrer was charged with 10.0 g ($8.65\times10^{-3}$ mol of Si—H group) of a component (e) having the following formula:

[Chem. 50]

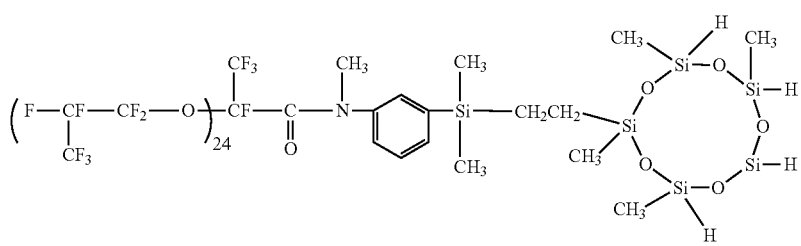

2.2 g ($1.30 \times 10^{-2}$ mol) of allyloxyethyl methacrylate, and 10.0 g of m-xylene hexafluoride, and the mixture was heated to 90° C. and stirred under a nitrogen atmosphere. Thereto was charged $2.0 \times 10^{-2}$ g of a toluene solution of a chloroplatinic acid/vinylsiloxane complex (containing $0.6 \times 10^{-7}$ mol as Pt alone), and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 8.9 g of a translucent white highly viscous liquid fluorine-containing acrylic compound (E) having the following formula:

[Chem. 51]

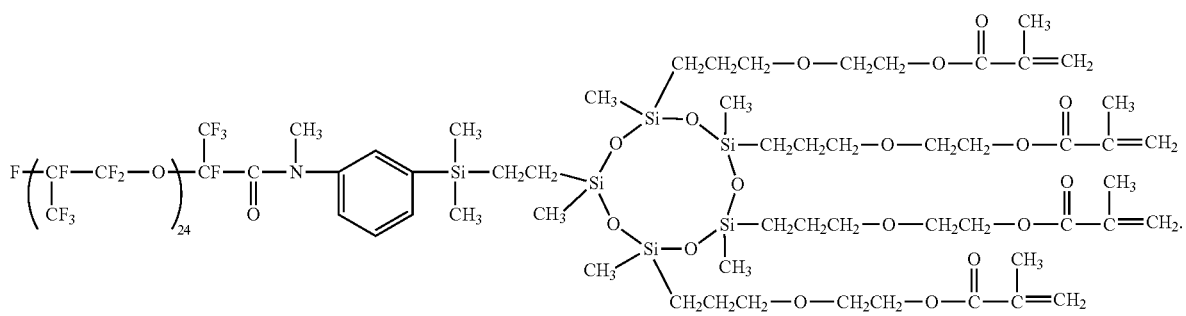

[Synthesis Example 6] Synthesis of Fluorine-Containing Acrylic Compound (F)

A 100 mL four-necked flask equipped with a reflux device and a stirrer was charged with 10.0 g ($8.88 \times 10^{-3}$ mol of Si—H group) of a component (f) having the following formula:

[Chem. 52]

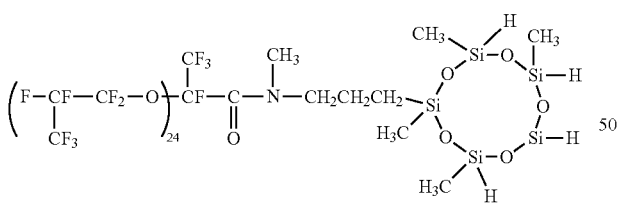

2.3 g ($1.33 \times 10^{-2}$ mol) of allyloxyethyl methacrylate, and 10.0 g of m-xylene hexafluoride, and the mixture was heated to 90° C. and stirred under a nitrogen atmosphere. Thereto was charged $2.0 \times 10^{-2}$ g of a toluene solution of a chloroplatinic acid/vinylsiloxane complex (containing $0.6 \times 10^{-7}$ mol as Pt alone), and the mixture was stirred at 80° C. for 4 hours. After confirming disappearance of the Si—H group by $^1$H-NMR and IR, the solvent and excess allyloxyethyl methacrylate were distilled off under reduced pressure, and activated carbon treatment was performed to obtain 8.9 g of a translucent white highly viscous liquid fluorine-containing acrylic compound (F) having the following formula:

[Chem. 53]

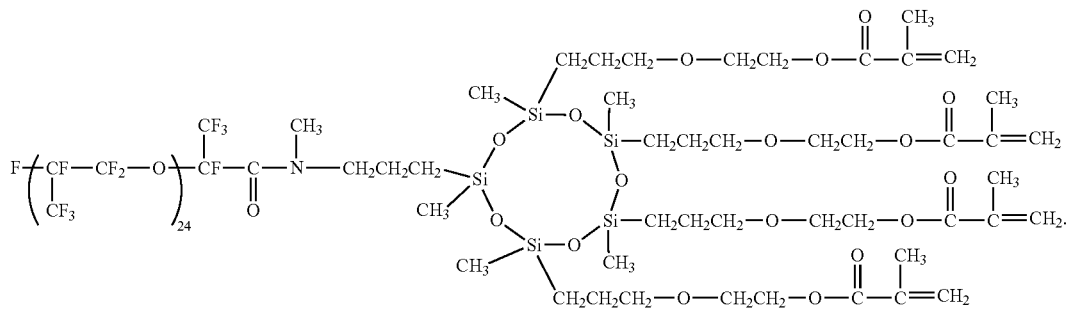

Examples 1 to 6, Comparative Example 1

Preparation of Fluorine-Containing Active Energy Ray-Curable Composition

Solutions were prepared in which the compounds (A) to (F) synthesized in Synthesis Examples and a fluorine-containing acrylic compound (X) (KY-1203, manufactured by Shin-Etsu Chemical Co., Ltd.) containing a urethane bond in a molecule were each blended in the proportions shown in Table 1 below. The amount (1 part by weight) of (X) in the table is the amount of the solid content (active ingredient) of KY-1203.

TABLE 1

| | Example 1 | Example 2 | Example 3 | Example 4 | Example 5 | Example 6 | Comparative Example 1 |
|---|---|---|---|---|---|---|---|
| E-40 | 100 Parts by weight | 100 Parts by weight | 100 Parts by weight | 100 Parts by weight | 100 Parts by weight | 100 Parts by weight | 100 Parts by weight |
| IPA | 142 Parts by weight | 142 Parts by weight | 142 Parts by weight | 142 Parts by weight | 142 Parts by weight | 142 Parts by weight | 142 Parts by weight |
| I-184 | 3 Parts by weight | 3 Parts by weight | 3 Parts by weight | 3 Parts by weight | 3 Parts by weight | 3 Parts by weight | 3 Parts by weight |
| Compound (A) | 1 Parts by weight | | | | | | |
| Compound (B) | | 1 Parts by weight | | | | | |
| Compound (C) | | | 1 Parts by weight | | | | |
| Compound (D) | | | | 1 Parts by weight | | | |
| Compound (E) | | | | | 1 Parts by weight | | |
| Compound (F) | | | | | | 1 Parts by weight | |
| Compound (X) | | | | | | | 1 Parts by weight |

E-40: tetrafunctional acrylate (EBECRYL 40, manufactured by Daicel-Cytec Co., Ltd.)
IPA: solvent (isopropanol)
I-184: 1-hydroxycyclohexyl phenyl ketone (IRGACURE 184, manufactured by Ciba Japan K.K.)

Coating and Preparation of Cured Film

Each of the prepared solutions was applied onto a polycarbonate substrate by spin coating. After coating, leveling was performed at room temperature for 10 minutes, and then the coated surface was irradiated with ultraviolet rays with an integrated irradiation dose of 1,600 mJ/cm$^2$ in a nitrogen atmosphere using a conveyor type metal halide UV irradiation device (manufactured by Panasonic Electric Works Co., Ltd.) to cure the composition, thereby obtaining a cured film with a thickness of 9 in.

Appearance (transparency) of the cured film obtained above was visually measured, and water contact angle measurement, oleic acid contact angle measurement and evaluation of marker resistance were performed as evaluation of anti-fouling property by the following methods, and water contact angle measurement after abrasion test was performed as evaluation of abrasion resistance. These results are shown in Table 2.

Evaluation of Anti-Fouling Property

[Water Contact Angle Measurement, Oleic Acid Contact Angle Measurement]

For the cured film prepared above, a contact angle of the cured film with respect to water and oleic acid was measured using a contact angle meter Drop Master (manufactured by Kyowa Interface Science Co., Ltd.) (droplet: 2 μl, temperature: 25° C., humidity (RH): 40%).

[Evaluation of Marker Resistance (Marker Repellency)]

For the cured film prepared above, a straight line was drawn with a marker pen (magic ink, large, manufactured by Teranishi Chemical Industry Co., Ltd.), and the cured film that repelled the ink was evaluated as "◯", and the cured film that did not repel the ink was evaluated as "x."

Evaluation of Abrasion Resistance

[Evaluation of Water Contact Angle after Abrasion Test]

A surface of the cured film was subjected to an abrasion test using a rubbing tester (manufactured by Shinto Scientific Co., Ltd.), and a water contact angle after the test was measured. Evaluation was an average number of times performed at N=8.

Test conditions are shown below.
Eraser: RUBBER STICK (manufactured by Minoan)
Movement distance (one way): 40 mm
Movement speed: 3,200 mm/min
Load: 300 g/6 mm² φ
Number of wear: 8,000 times

TABLE 2

|  | Appearance | Water contact angle (°) | Oleic acid contact angle (°) | Magic ink repellency | Water contact angle (°) after abrasion test |
|---|---|---|---|---|---|
| Example 1 | Colorless and transparent | 112 | 73 | ○ | 105 |
| Example 2 | Colorless and transparent | 110 | 72 | ○ | 103 |
| Example 3 | Colorless and transparent | 111 | 71 | ○ | 100 |
| Example 4 | Colorless and transparent | 109 | 71 | ○ | 102 |
| Example 5 | Colorless and transparent | 111 | 72 | ○ | 100 |
| Example 6 | Colorless and transparent | 110 | 71 | ○ | 101 |
| Comparative Example 1 | Colorless and transparent | 112 | 73 | ○ | 79 |

Examples 1 to 6 prepared using fluorine-containing acrylic compounds (compounds (A) to (F)) free of urethane bond in the molecular structures as water/oil repellency and anti-fouling property imparting agents showed excellent anti-fouling property and high abrasion resistance. On the other hand, Comparative Example 1 prepared using a fluorine-containing acrylic compound containing a urethane bond in the molecular structure as a water/oil repellency and anti-fouling property imparting agent showed excellent anti-fouling property, but the water contact angle was greatly reduced by the abrasion test, and low abrasion resistance was exhibited.

The invention claimed is:

1. A fluorine-containing acrylic compound having the following general formula (1):

$$Y—Rf^1—Z^1-Q^1-[Z^2—X]_a \quad (1)$$

wherein $Rf^1$ is a divalent perfluoropolyether group with a molecular weight of 400 to 20,000 composed of a perfluoroalkylene group having 1 to 6 carbon atoms and an oxygen atom, $Z^1$ is independently a divalent hydrocarbon group having 1 to 20 carbon atoms which may contain one or more selected from an oxygen atom, a nitrogen atom and a silicon atom, and which may contain a cyclic structure therein, with the proviso that $Z^1$ is free of a urethane bond in its structure, $Q^1$ is independently an (a+1)-valent linking group containing at least (a+1) number of silicon atoms, which may take a cyclic structure, and which may contain at least one selected from an oxygen atom, a nitrogen atom and a fluorine atom, with the proviso that $Q^1$ is free of a urethane bond in its structure, $Z^2$ is independently a divalent alkylene ether group having the following formula:

$$—C_oH_{2o}—(OC_4H_8)_i(OC_3H_6)_j(OC_2H_4)_k(OCH_2)_l—$$

wherein each repeating unit may be linear or branched, the repeating units may be randomly arranged, i, j, k, and l are each independently an integer of 0 to 10, wherein the sum of i, j, k, and l is 1 or more, in a range where a molecular weight of $Z^2$ is 58 to 330, and o is an integer of 2 to 10, X is independently a hydrogen atom or a monovalent organic group containing an acrylic group or an α-substituted acrylic group which may contain at least one selected from an oxygen atom and a nitrogen atom, containing on the average at least one of the monovalent organic group containing an acrylic group or an α-substituted acrylic group per molecule, with the proviso that each X is free of a urethane bond in its structure, a is independently an integer of 1 to 10, and Y is a fluorine atom or a monovalent group of —$Z^1$-$Q^1$-$[Z^2—X]_a$, wherein $Z^1$ and "a" number of $Z^2$s enclosed in brackets [ ] in the formula (1) are all bonded to silicon atoms in the $Q^1$ structure, respectively.

2. The fluorine-containing acrylic compound according to claim 1, wherein
in the fluorine-containing acrylic compound having the general formula (1), $Rf^1$ is a divalent perfluoropolyether group having the following formula:

[Chem. 1]

$$—C_bF_{2b}—O—(CF_2O)_c—(C_2F_4O)_d—(C_3F_6O)_e—(C_4F_8O)_f—(C_5F_{10}O)_g—(C_6F_{12}O)_h—C_bF_{2b}—$$

wherein b is independently for each unit an integer of 1 to 3, c, d, e, f, g, and h are each an integer of 0 to 200, and c+d+e+f+g+h is 3 to 200, each of these units may be linear or branched, and each of the repeating units shown in parentheses appended with c, d, e, f, g, and h may be randomly arranged.

3. The fluorine-containing acrylic compound according to claim 1, wherein
in the fluorine-containing acrylic compound having the general formula (1), $Rf^1$ is any of divalent perfluoropolyether groups having the following structural formulas:

$$—CF_2O—(CF_2O)_p(CF_2CF_2O)_q—CF_2—$$

[Chem. 2]

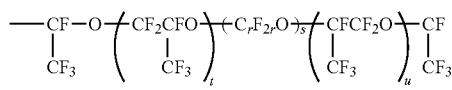

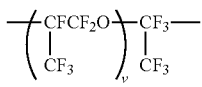

wherein, with the proviso that the repeating units enclosed in parentheses ( ) are randomly arranged, p is an integer of 1 to 199, q is an integer of 1 to 170, and p+q is 6 to 200, r is an integer of 1 to 6, s is an integer of 0 to 6, t and u are each an integer of 1 to 100, t+u is an integer of 2 to 120, and s+t+u is an integer of 3 to 126, and v is an integer of 4 to 120.

4. The fluorine-containing acrylic compound according to claim 1, wherein
in the fluorine-containing acrylic compound having the general formula (1), $Z^1$ has a structure having any of the following formulas:

—CH$_2$CH$_2$CH$_2$CH$_2$—

—CH$_2$OCH$_2$CH$_2$CH$_2$—

[Chem. 3]

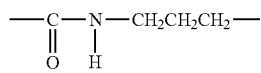

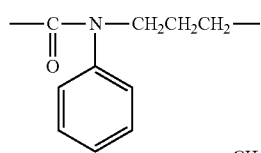

5. The fluorine-containing acrylic compound according to claim 1, wherein
in the fluorine-containing acrylic compound having the general formula (1), $Q^1$ is an (a'+1)-valent linking group having the following formula:

[Chem. 4]

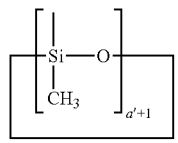

wherein a' is an integer of 2 to 10.

6. The fluorine-containing acrylic compound according to claim 1, wherein
in the fluorine-containing acrylic compound having the general formula (1), X has a structure having the following formula:

[Chem. 5]

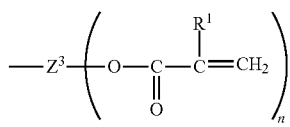

wherein $R^1$ is each independently a hydrogen atom, a fluorine atom, a methyl group, or a trifluoromethyl group, $Z^3$ is a single bond, or a divalent or trivalent hydrocarbon group having 1 to 18 carbon atoms and optionally containing an ether bond and/or an ester bond, and n is 1 or 2.

7. The fluorine-containing acrylic compound according to claim 1, wherein the fluorine-containing acrylic compound having the general formula (1) is a fluorine-containing acrylic compound having the following general formula (2) or (3):

[Chem. 6]

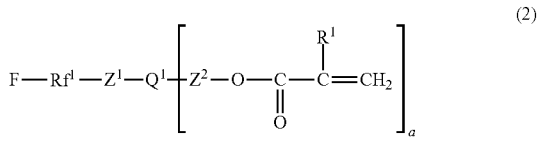

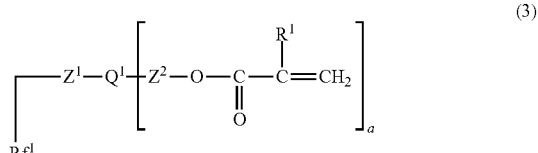

wherein $Rf^1$, $Z^1$, $Z^2$, $Q^1$ and a are as defined above, and $R^1$ is each independently a hydrogen atom, a fluorine atom, a methyl group, or a trifluoromethyl group.

8. The fluorine-containing acrylic compound according to claim 1, wherein the fluorine-containing acrylic compound having the general formula (1) is a fluorine-containing acrylic compound having the following general formula (4) or (5):

[Chem. 7]

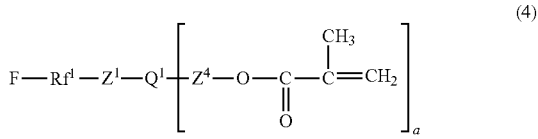

(5)

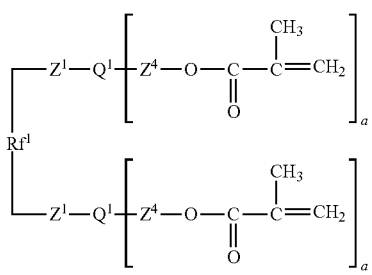

wherein $Rf^1$, $Z^1$, $Q^1$ and a are as defined above, and $Z^4$ is a divalent alkylene ether group having the following formula:

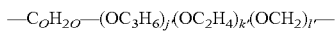

wherein each repeating unit may be linear or branched, the repeating units may be randomly arranged, and j', k', and l' are each independently an integer of 0 to 4, with the proviso that the sum of j', k', and l' is not 0, and o is an integer of 2 to 10.

9. The fluorine-containing acrylic compound according to claim 1, wherein the fluorine-containing acrylic compound is selected from fluorine-containing acrylic compounds having the following formulas:

wherein $Rf^2$ is $-CF_2O-(CF_2O)_p(CF_2CF_2O)_q-CF_2-$, p is an integer of 1 to 199, q is an integer of 1 to 170, p+q is 6 to 200, and the repeating units enclosed in parentheses ( ) are randomly arranged, v is an integer of 4 to 120, $R^2$ is independently a hydrogen atom or a methyl group, and $R^3$ is independently a hydrogen atom, a methyl group, or a phenyl group, $Z^4$ is a divalent alkylene ether group having the following formula:

wherein each repeating unit may be linear or branched, the repeating units may be randomly arranged, and j', k', and l' are each independently an integer of 0 to 4, with the proviso that the sum of j', k', and l' is not 0, and o is an integer of 2 to 10, and m is an integer of 2 to 5.

10. A fluorine-containing active energy ray-curable composition comprising 0.005 to 40 parts by weight of the fluorine-containing acrylic compound according to claim 1 per 100 parts by weight of the active energy ray-curable composition.

11. The fluorine-containing active energy ray-curable composition according to claim 10, wherein the content of a volatile fluorine compound is 1 part by weight or less per 100 parts by weight of the active energy ray-curable composition.

12. An article having a cured product layer of the fluorine-containing active energy ray-curable composition according to claim 10 on its surface.

13. An article having a cured product layer of the fluorine-containing active energy ray-curable composition according

[Chem. 8]

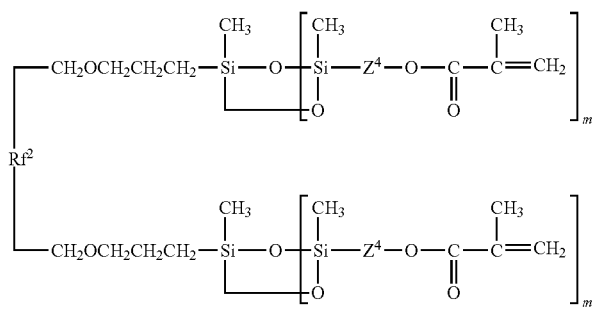

[Chem. 9]

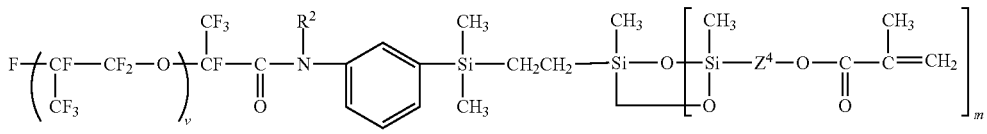

[Chem. 10]

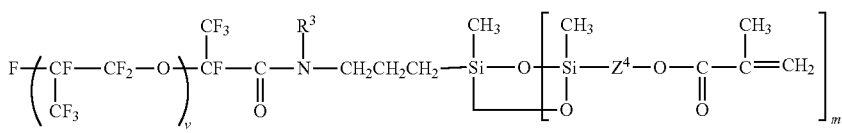

to claim 10 on its surface, which has a water contact angle at 25° C. and a relative humidity of 40% of 90° or more.

\* \* \* \* \*